US010445435B2

(12) United States Patent
Han et al.

(10) Patent No.: US 10,445,435 B2
(45) Date of Patent: Oct. 15, 2019

(54) AUTO-CONVERSION MECHANISM FOR MULTIPLE THREE-DIMENSIONAL OBJECT REPRESENTATIONS TO FACILITATE COLLABORATION

(71) Applicant: IronCAD, LLC, Atlanta, GA (US)

(72) Inventors: Tao-Yang Han, Atlanta, GA (US); Yawei Li, Atlanta, GA (US)

(73) Assignee: IRONCAD, LLC, Atlanta, GA (US)

( * ) Notice: Subject to any disclaimer, the term of this patent is extended or adjusted under 35 U.S.C. 154(b) by 451 days.

(21) Appl. No.: 14/927,773

(22) Filed: Oct. 30, 2015

(65) Prior Publication Data

US 2016/0125100 A1  May 5, 2016

Related U.S. Application Data

(60) Provisional application No. 62/072,616, filed on Oct. 30, 2014.

(51) Int. Cl.
G06F 17/50 (2006.01)
(52) U.S. Cl.
CPC .......... G06F 17/50 (2013.01); G06F 2217/04 (2013.01)
(58) Field of Classification Search
CPC ............... G06F 17/50; G06F 2217/04
(Continued)

(56) References Cited

U.S. PATENT DOCUMENTS 7,933,952 B2 * 4/2011 Parker ................. H04L 12/1813
709/204

2003/0103089 A1 * 6/2003 Ramani ................. G06F 17/50
715/848

(Continued)

OTHER PUBLICATIONS

Fan, Bailin, Ganghan Huang, and Ma Quan. "Analysis and Comparison of Application of Reducing Mill by Pro/MECHANICA and ANSYS." Proceedings of the 2012 International Conference on Communication, Electronics and Automation Engineering. Springer Berlin Heidelberg, 2013. pp. 727-728.*

(Continued)

Primary Examiner — Kamini S Shah
Assistant Examiner — John E Johansen
(74) Attorney, Agent, or Firm — Locke Lord LLP; Tim Tingkang Xia, Esq.

(57) ABSTRACT

A system with generalized representation conversion capabilities, including at least one computing device in a client-server structure. A user may operate the client computing device to use a computer-aided design (CAD) software to implement geometric models for multiple objects, and request data from the server. A data store at the server stores necessary information of the system, which includes master representation information of a plurality of master representations (MRs), each MR representing one or more objects. When the user requests an individual representation of a selected object, a conversion module at the server may obtain, from the data store, the master representation information corresponding to the MR of the selected object being requested, and convert the master representation information to individual representation information, which corresponds to the individual representation of the selected object. The conversion module may then send the individual representation information to the client for the user.

55 Claims, 8 Drawing Sheets

(58) Field of Classification Search
USPC .............................................................. 703/1
See application file for complete search history.

(56) References Cited

U.S. PATENT DOCUMENTS

2014/0279844 A1* 9/2014 Shukla .................... G06F 16/93
707/608
2016/0042097 A1* 2/2016 Briggs ................ G06F 17/5009
703/1

OTHER PUBLICATIONS

Fan, Bailin, Ganghan Huang, and Ma Quan. "Analysis and Comparison of Application of Reducing Mill by Pro/MECHANICA and ANSYS." Proceedings of the 2012 International Conference on Communication, Electronics and Automation Engineering. Springer Berlin Heidelberg, 2013. pp. 727-728. (Year: 2013).*

* cited by examiner

500

AUTO-CONVERSION MECHANISM FOR MULTIPLE THREE-DIMENSIONAL OBJECT REPRESENTATIONS TO FACILITATE COLLABORATION

CROSS-REFERENCE TO RELATED PATENT APPLICATION

This application claims priority to and the benefit of, pursuant to 35 U.S.C. § 119(e), U.S. provisional patent application Ser. No. 62/072,616, filed Oct. 30, 2014, entitled "AUTO-CONVERSION MECHANISM FOR MULTIPLE 3D OBJECT REPRESENTATIONS TO FACILITATE COLLABORATION," by Tao Yang Han and Yawei Li, the disclosure of which is incorporated herein in its entirety by reference.

FIELD OF THE INVENTION

This invention relates generally to computer-aided design (CAD) systems, methods and software applications, and particularly to computerized systems and methods with automatic conversion mechanisms for representations of three-dimensional objects to facilitate collaboration.

BACKGROUND OF THE INVENTION

The computer has greatly affected essentially all forms of information management, including the geometric modeling arts. When a manufacturing company develops and markets a new product, it usually goes through a long process. This process typically includes a plurality of stages, such as conceptual design, detail design, engineering simulation, manufacturing, marketing and sales, customer training and support, etc. At individual stages of product development, different tasks are performed by people of different background and skill. Therefore, different software tools have been developed to provide needed functions at each stage. These software tools create and modify data associated with the same product. However, since the functions performed by the software tools are different, the data format that best supports the needed functions may be different.

Therefore, a heretofore unaddressed need exists in the art to address the aforementioned deficiencies and inadequacies.

SUMMARY OF THE INVENTION

In one aspect, the present invention relates to a system with generalized representation conversion (GRC) capabilities. In certain embodiments, the system includes at least one computing device, each comprising a processor and a storage device storing computer executable code. The computer readable code includes a data store, a conversion module, and at least one modification tool. The data store is configured to store master representation information of a plurality of master representations (MRs), where each of the MRs represents one or more of a plurality of three-dimensional (3D) objects. The conversion module is executable by the processor of the at least one computing device, configured to: obtain, from the data store, the master representation information corresponding to the MR of at least one selected object of the 3D objects; convert the master representation information obtained to individual representation information, wherein the individual representation information corresponds to an individual representation of the at least one selected object; and in response to receiving modified individual representation information corresponding to the individual representation of the at least one selected object, convert the modified individual representation information received to the master representation information. Each of the at least one modification tool is executable by the processor of the at least one computing device, configured to, in response to receiving a modification action to the individual representation: modify the individual representation information to generate the modified individual representation information; and send the modified individual representation information back to the conversion module.

In certain embodiments, the at least one computing device includes: at least one server computing device, storing the conversion module, the modification tool and the data store; and at least one remote computing device remotely connected to the at least one server computing device through a network, wherein each of the at least one remote computing device functions as a client computer. In certain embodiments, the network is an Internet, a Local Area Network (LAN), or a Wide Area Network (WAN).

In certain embodiments, the data store is a local database stored in the at least one server computing device together with the conversion module and the modification tool.

In certain embodiments, the at least one server computing device includes: a conversion server, storing the conversion module and the modification tool; and a data server remotely connected to the conversion server through the network and storing the data store, where the data store is a virtual database resided in the data server.

In certain embodiments, the conversion module is further configured to send the individual representation information being converted together with a special identifier (SI) to the at least one remote computing device through the network.

In certain embodiments, the conversion module is configured to send the individual representation information being converted and the SI together with one of the at least one modification tool to the at least one remote computing device through the network, wherein the modification tool being sent to the remote computing device is executable by the remote computing device.

In certain embodiments, the at least one modification tool may be pre-installed in the at least one remote computing device to be executable by the remote computing device.

In certain embodiments, the conversion module is configured to obtain, from the data store, the master representation information corresponding to the MR of the at least one selected object by: receiving, from the remote computing device, a request for the individual representation corresponding to the at least one selected object, wherein the request comprises the SI to identify the master representation information corresponding to the master representation of the at least one selected object; and retrieving, from the data store, the master representation information based on the SI of the request using a unique identification mechanism (UIM).

In certain embodiments, the conversion module is configured to convert the master representation information obtained to the individual representation information by: retrieving, based on the request, information necessary for the individual representation from the master representation information of the at least one selected object; and generating the individual representation information using the retrieved information necessary for the individual representation.

In certain embodiments, for each of the MRs, the master representation information includes geometry data and non-geometry data of the one or more objects being represented by the MR.

In certain embodiments, the modification action to the individual representation is an action of updating the MR of the at least one selected object, and the modification tool is configured to send the modified individual representation information and the SI back to the conversion module for updating the master representation information of the MR of the at least one selected object.

In certain embodiments, the conversion module, in response to receiving the modified individual representation information corresponding to the individual representation of the at least one selected object, is configured to convert the modified individual representation information and the SI received to updated master representation information, and to store the updated master representation information in the data store to replace the master representation information of the MR of the at least one selected object.

In certain embodiments, the conversion module is configured to convert the modified individual representation information received to updated master representation information by: locating the master representation information corresponding to the SI in the data store; and updating the master representation information using the modified individual representation information received to generate the updated master representation information.

In certain embodiments, the individual representation information generated includes at least a portion of the geometry data. In certain embodiments, the modification action to the individual representation is an action of changing geometry of the at least one selected object, and the modification tool is configured to modify the individual representation information by changing the geometry data corresponding to the geometry of the at least one selected object.

In certain embodiments, the individual representation information generated further includes the non-geometry data. In certain embodiments, the modification action to the individual representation is an action of changing a non-geometry feature of the at least one selected object, and the modification tool is configured to modify the individual representation information by changing the non-geometry data corresponding to the non-geometry feature of the at least one selected object.

In certain embodiments, the modification action to the individual representation is an action of deleting the at least one selected object, and the modification tool is configured to modify the individual representation information by deleting information corresponding to the at least one selected object.

In certain embodiments, the modification action to the individual representation is an action of creating a new MR, and the modification tool is configured to send the modified individual representation information back to the conversion module for generating new master representation information of the new MR. In certain embodiments, the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

In certain embodiments, the new MR is created by combining a plurality of the individual representations.

In certain embodiments, the modification tool includes a computer-aided design (CAD) software configured to implement a geometric model of each of the plurality of 3D objects, and the geometric model is a solid shape model, a polygonal shape model, a point cloud set model, or a combination thereof.

In certain embodiments, the modification tool includes a computer-aided engineering (CAE) software to perform a CAE process and create or modify non-geometry engineering data, wherein the CAE process includes finite element analysis, stress analysis, thermal analysis, electromagnetics analysis, fluid dynamic analysis, kinematics analysis, collision analysis, and dynamic analysis.

Another aspect of the present invention relates to a computer-implemented method of performing GRC. In one embodiment, the method includes: (a) providing a data store being stored in at least one server computing device, the data store storing master representation information of a plurality of MRs, wherein each of the MRs represents one or more of a plurality of objects; (b) obtaining, by a conversion module executed by the at least one server computing device, the master representation information corresponding to the MR of at least one selected object of the objects from the data store; (c) converting, by the conversion module, the master representation information obtained to individual representation information, wherein the individual representation information corresponds to an individual representation of the at least one selected object; (d) sending, by the conversion module, the individual representation information being converted together with a special identifier (SI) to at least one remote computing device, wherein the at least one remote computing device is remotely connected to the at least one server computing device through a network, and at least one modification tool is executable by the at least one remote computing device; and (e) in response to receiving, by the conversion module, modified individual representation information corresponding to the individual representation of the at least one selected object, converting the modified individual representation information received to the master representation information. In certain embodiments, the at least one modification tool, when executed by the at least one remote computing device, is configured to, in response to receiving a modification action to the individual representation: (1) modify the individual representation information to generate the modified individual representation information; and (2) send the modified individual representation information back to the conversion module at the server computing device.

In certain embodiments, the data store is a local database stored in the at least one server computing device together with the conversion module and the modification tool.

In certain embodiments, the at least one server computing device includes: a conversion server, storing the conversion module and the modification tool; and a data server remotely connected to the conversion server through the network and storing the data store, where the data store is a virtual database resided in the data server.

In certain embodiments, the master representation information corresponding to the MR of the at least one selected object is obtained by the conversion module from the data store by: receiving, from the at least one remote computing device, a request for the individual representation corresponding to the at least one selected object, wherein the request comprises a SI to identify the master representation information corresponding to the master representation of the at least one selected object; and retrieving, from the data store, the master representation information based on the SI of the request using a UIM.

In certain embodiments, the master representation information obtained is converted by the conversion module to the individual representation information by: retrieving, based on the request, information necessary for the individual representation from the master representation information of the at least one selected object; and generating the individual representation information using the retrieved information necessary for the individual representation.

In certain embodiments, for each of the MRs, the master representation information includes geometry data and non-geometry data of the one or more objects being represented by the MR.

In certain embodiments, the modification action to the individual representation is an action of updating the MR of the at least one selected object, and the modification tool is configured to send the modified individual representation information and the SI back to the conversion module for updating the master representation information of the MR of the at least one selected object. In certain embodiments, the conversion module, in response to receiving the modified individual representation information corresponding to the individual representation of the at least one selected object and the SI, is configured to convert the modified individual representation information received to updated master representation information, and to store the updated master representation information in the data store to replace the master representation information of the MR of the at least one selected object.

In certain embodiments, the conversion module is configured to convert the modified individual representation information received to updated master representation information by: locating the master representation information corresponding to the SI in the data store; and updating the master representation information using the modified individual representation information received to generate the updated master representation information.

In certain embodiments, the individual representation information generated includes at least a portion of the geometry data. In certain embodiments, the modification action to the individual representation is an action of changing geometry of the at least one selected object, and the modification tool is configured to modify the individual representation information by changing the geometry data corresponding to the geometry of the at least one selected object.

In certain embodiments, the individual representation information generated further includes the non-geometry data. In certain embodiments, the modification action to the individual representation is an action of changing a non-geometry feature of the at least one selected object, and the modification tool is configured to modify the individual representation information by changing the non-geometry data corresponding to the non-geometry feature of the at least one selected object.

In certain embodiments, the modification action to the individual representation is an action of deleting the at least one selected object, and the modification tool is configured to modify the individual representation information by deleting information corresponding to the at least one selected object.

In certain embodiments, the modification action to the individual representation is an action of creating a new MR, and the modification tool is configured to send the modified individual representation information back to the conversion module for generating new master representation information of the new MR. In certain embodiments, the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

In certain embodiments, the new MR is created by combining a plurality of the individual representations.

A further aspect of the present invention relates to a non-transitory computer readable medium storing computer executable code. In one embodiment, the computer executable code, when executed at a processor of at least one server computing device, is configured to: provide a data store being stored in the at least one server computing device, the data store storing master representation information of a plurality of MRs, wherein each of the MRs represents one or more of a plurality of 3D objects; obtain the master representation information corresponding to the MR of at least one selected object of the 3D objects from the data store; convert the master representation information obtained to individual representation information, wherein the individual representation information corresponds to an individual representation of the at least one selected object; send the individual representation information being converted together with a special identifier (SI) to at least one remote computing device, wherein the at least one remote computing device is remotely connected to the at least one server computing device through a network, and at least one modification tool is executable by the at least one remote computing device; and in response to receiving modified individual representation information corresponding to the individual representation of the at least one selected object, convert the modified individual representation information received to the master representation information. In certain embodiments, the at least one modification tool, when executed by the at least one remote computing device, is configured to, in response to receiving a modification action to the individual representation: modify the individual representation information to generate the modified representation information; and send the modified individual representation information back to the server computing device.

In certain embodiments, the computer executable code includes a conversion module executable by at least one computing device.

In certain embodiments, the data store is a local database stored in the at least one server computing device together with the conversion module and the modification tool.

In certain embodiments, the at least one server computing device includes: a conversion server, storing the conversion module and the modification tool; and a data server remotely connected to the conversion server through the network and storing the data store, where the data store is a virtual database resided in the data server.

In certain embodiments, the conversion module is configured to obtain, from the data store, the master representation information corresponding to the MR of the at least one selected object by: receiving, from the remote computing device, a request for the individual representation corresponding to the at least one selected object, wherein the request includes the SI to identify the master representation information corresponding to the master representation of the at least one selected object; and retrieving, from the data store, the master representation information based on the SI of the request using a unique identification mechanism (UIM).

In certain embodiments, the conversion module is configured to convert the master representation information obtained to the individual representation information by: retrieving, based on the request, information necessary for the individual representation from the master representation information of the at least one selected object; and generating the individual representation information using the retrieved information necessary for the individual representation.

In certain embodiments, for each of the MRs, the master representation information includes geometry data and non-geometry data of the one or more objects being represented by the MR.

In certain embodiments, the modification action to the individual representation is an action of updating the MR of the at least one selected object, and the modification tool is configured to send the modified individual representation information and the SI back to the conversion module for updating the master representation information of the MR of the at least one selected object. In certain embodiments, the conversion module, in response to receiving the modified individual representation information corresponding to the individual representation of the at least one selected object and the SI, is configured to convert the modified individual representation information received to updated master representation information, and to store the updated master representation information in the data store to replace the master representation information of the MR of the at least one selected object.

In certain embodiments, the conversion module is configured to convert the modified individual representation information received to updated master representation information by: locating the master representation information corresponding to the SI in the data store; and updating the master representation information using the modified individual representation information received to generate the updated master representation information.

In certain embodiments, the individual representation information generated includes at least a portion of the geometry data. In certain embodiments, the modification action to the individual representation is an action of changing geometry of the at least one selected object, and the modification tool is configured to modify the individual representation information by changing the geometry data corresponding to the geometry of the at least one selected object.

In certain embodiments, the individual representation information generated further includes the non-geometry data. In certain embodiments, the modification action to the individual representation is an action of changing a non-geometry feature of the at least one selected object, and the modification tool is configured to modify the individual representation information by changing the non-geometry data corresponding to the non-geometry feature of the at least one selected object.

In certain embodiments, the modification action to the individual representation is an action of deleting the at least one selected object, and the modification tool is configured to modify the individual representation information by deleting information corresponding to the at least one selected object.

In certain embodiments, the modification action to the individual representation is an action of creating a new MR, and the modification tool is configured to send the modified individual representation information back to the conversion module for generating new master representation information of the new MR. In certain embodiments, the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

In certain embodiments, the new MR is created by combining a plurality of the individual representations.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The following figures are presented for the purpose of illustration only, and are not intended to be limiting.

DETAILED DESCRIPTION OF THE INVENTION

Figure 1:
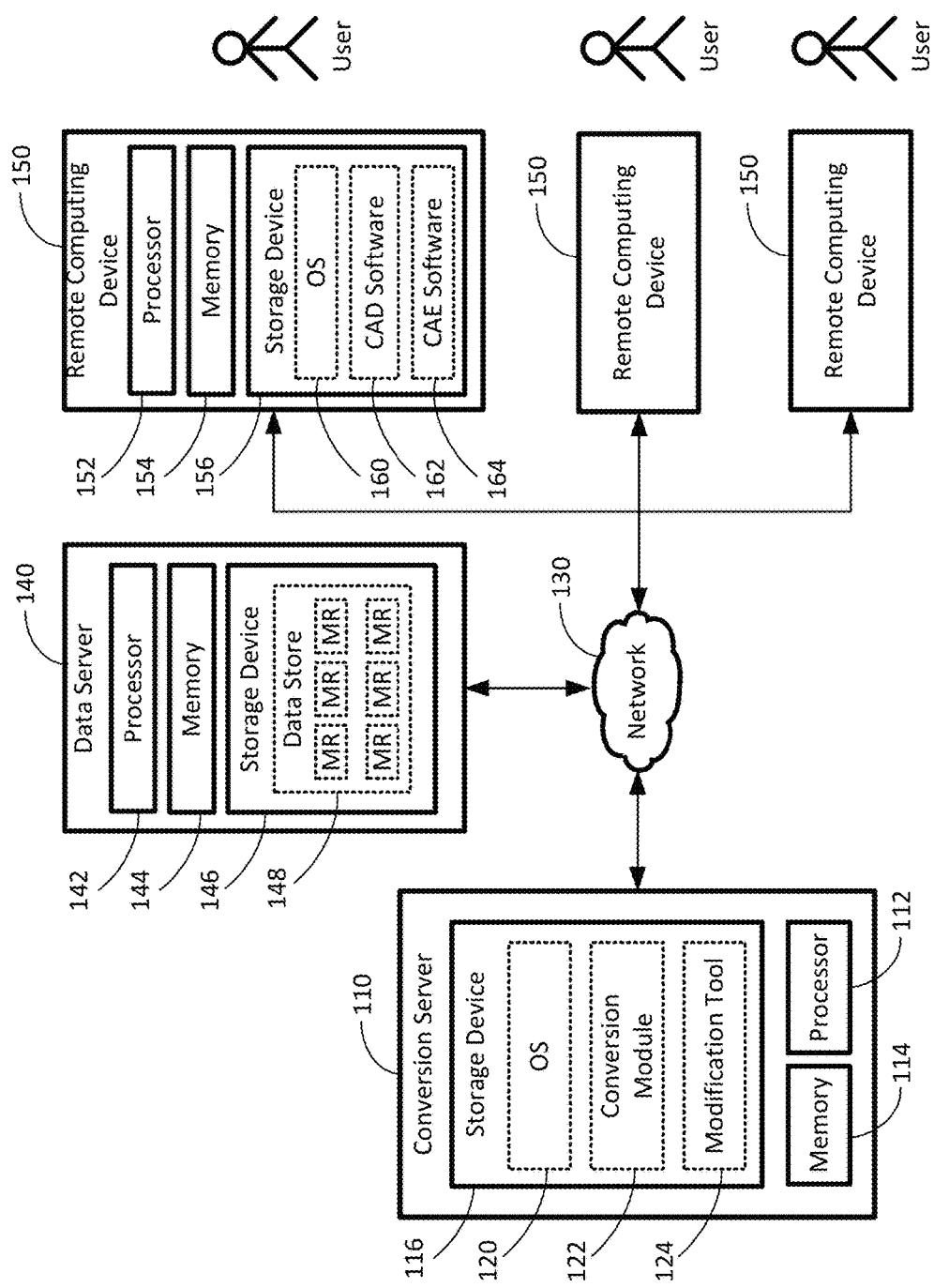
FIG. 1 schematically shows a system according to certain embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "computer-aided design software" or its abbreviation "CAD software" may refer to computer-aided design software and any other design collaboration software, such as space planning, architecture, computer-aided engineering (CAE), or game features that include geometric modeling of components or similar actions.

As used herein, the term "solid shape" may refer to a 3D geometric object represented by Boundary Representation (BREP), or other representations that can precisely and unambiguously represent a 3D geometric object. A solid shape object can be a solid (closed volume), surface/sheet, and or wire shape.

As used herein, the term "hierarchical structure" is a hierarchical structure of components created by a CAD software representing a 3D model, which may include multiple levels. A higher level component (above component or assembly) may be composed of a number of lower level components (below components). Any one of the below components may be a component by itself and has no other components below it (simple component or part), or an above component which has its own below components (sub-assembly). For example, a 3D model representing a table is an assembly which is composed of table top, support, and container. Support and container are subassemblies and each is composed of a number of leg parts and drawer parts, respectively; while table top is a part.

As used herein, the term "module" may refer to, be part of, or include suitable software components that provide the described functionality. In certain embodiments, the term module may include both software components, such as codes, and hardware components that execute the codes.

The term "code", as used herein, may include software, firmware, and/or microcode, and may refer to programs, routines, functions, classes, and/or objects. The term "shared", as used herein, means that some or all code from multiple hardware modules may be executed using a single (shared) processor. In addition, some or all code from multiple hardware modules may be stored by a single (shared) memory. The term "group", as used herein, means that some or all code from a single hardware module may be executed using a group of processors. In addition, some or all code from a single hardware module may be stored using a group of memories.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

OVERVIEW OF THE INVENTION

As described above, different software tools have been developed to provide different functions, and the data format that best supports the needed functions may be different. For example, design is usually performed by Computer-Aided Design (CAD) software, and requires precise geometric modeling representation so that it can be manufactured accurately. In certain embodiments, Computer-Aided Engineering (CAE) simulation may be performed, for example, by Finite-Element Analysis (FEA) which utilizes discretized mesh representation. For non-technical tasks such as marketing and sales a viewer dealing with light-weighted facet model representation would be a proper fit. This graphical data representation is sufficient for business communication while keeping the trade secret of precise design within the engineering department. Therefore, considering functional requirement, convenience, performance, and security factors, various representations of the same product design are necessary to support different software tools to perform needed functions at individual stages of product development.

Product Lifecycle Management (PLM) solution is a set of software tools to perform function at each stage of the product development and manage associated product data through the entire product lifecycle. Product development process is an iterative process. Design collaboration cross different stages of PLM with a broad range of departments and people is important. The product design data must be communicated among all participants and passed back and forth to share and avoid recreating so that one can increase efficiency and reduce possible human errors. Since the product data representation at different stages may be different it becomes critical to be able to convert from one representation to another without losing needed information.

At each stage, using the proper software tool for that stage, a product design may be modified according to a design change request; alternatively, it may be simplified to facilitate the functional needs of that particular stage, and extra product information associated with that particular stage or affect other stages may be added. Those modification and additional information that change the design or affecting other stages must be communicated to other representations at all stages of PLM. Among all product design representations 3D object representations are the widely used and most complete model representations. They serve well to represent product data at various stages of PLM.

In certain aspects of the present invention, a system with generalized representation conversion (GRC) capabilities is provided. In certain embodiments, the system may be a GRC system (GRCS), or may be a CAD geometric modeling system with the GRCS such that the system is provided with GRC capabilities. The GRCS relies on a well-defined Master Representation (MR), which is a complete, unambiguous, and compact representation of the product design. The MR contains sufficient information to generate any other representation, and is capable to store additional product related information. In certain embodiments, the GRCS utilizes an Individual Representation Generator (IRG) to generate different representations from the Master Representation. Additional product related information stored with the MR is also transferred to the newly generated representation. In certain embodiments, each particular representation has an associated IRG, and each IRG has specific intelligence to simplify the output representation or adding extra information for intended stage of PLM. Product modification performed on this representation by a software tool as well as extra product related information added to this representation is also stored.

In certain embodiments, a Unique Identification Mechanism (UIM) is developed to identify individual 3D object by its Special Identifier (SI) and find associated MR. When an IRG generates a particular representation of a 3D object it keeps the SI of that object with the resulting representation together with modification and extra information created by the IRG. When conversion from one representation to another is required, the GRCS invokes a Generalized Representation Convertor (GRC) to perform the task. The GRC utilizes the UIM to find corresponding MR of the current representation, then update the MR based on the modification information, and transfer extra product related information to the MR. After the MR is fully updated, a proper IRG can be invoked to generate the desired individual representation from the updated MR. Thus the automatic conversion from one representation to another may be achieved and all needed data will be maintained without losing necessary information.

Certain aspects of the present invention relate to systems and methods with GRC capabilities. In one aspect, the system includes at least one computing device, each including a processor and a storage device storing computer executable code. The computer readable code includes a data store, a conversion module, and at least one modification tool. The data store is configured to store master representation information of a plurality of master representations (MRs), where each of the MRs represents one or more of a plurality of 3D objects. The conversion module is executable by the processor of the at least one computing device, configured to: obtain, from the data store, the master representation information corresponding to the MR of at least one selected object of the 3D objects; convert the master representation information obtained to individual representation information, wherein the individual representation information corresponds to an individual representation of the at least one selected object; and in response to receiving modified individual representation information corresponding to the individual representation of the at least one selected object, convert the modified individual representation information received to the master representation information. The modification tool is executable by the processor of the at least one computing device, configured to, in response to receiving a modification action to the individual representation: modify the individual representation information to generate the modified individual representation information; and send the modified individual representation information back to the conversion module.

Another aspect of the present invention relates to a computer-implemented method of performing GRC. In one embodiment, the method includes: (a) providing a data store being stored in at least one server computing device, the data store storing master representation information of a plurality of MRs, wherein each of the MRs represents one or more of a plurality of 3D objects; (b) obtaining, by a conversion module executed by the at least one server computing device, the master representation information corresponding to the MR of at least one selected object of the 3D objects from the data store; (c) converting, by the conversion module, the master representation information obtained to individual representation information, wherein the individual representation information corresponds to an individual representation of the at least one selected object; (d) sending, by the conversion module, the individual representation information being converted together with a special identifier (SI) to at least one remote computing device, wherein the at least one remote computing device is remotely connected to the at least one server computing device through a network, and at least one modification tool is executable by the at least one remote computing device; and (e) in response to receiving, by the conversion module, modified individual representation information corresponding to the individual representation of the at least one selected object, converting the modified individual representation information received to the master representation information. In certain embodiments, the modification tool, when executed by the at least one remote computing device, is configured to, in response to receiving a modification action to the individual representation: (1) modify the individual representation information to generate the modified individual representation information; and (2) send the modified individual representation information back to the conversion module at the server computing device.

FIG. 1 schematically shows a system according to certain embodiments of the present invention. In certain embodiments, the system 100 may be a client-server system having GRC capacities, which is capable of performing CAD geometric modeling and CAE processes. Specifically, the system 100 may have one or more computing devices being interconnected via a network, and the computing devices may include at least one server computing device (which functions as a server computer) and at least one remote computing device (which functions as a client computer) for implementing the client-server structure. For example, as shown in FIG. 1, the system 100 includes multiple computing devices being interconnected via a network 130. The computing devices include a conversion server 110, a data server 140, and a plurality of remote computing devices 150. In certain embodiments, at least one user may be capable of control operation of the system 100 remotely through the remote computing device 150. Alternatively, in certain embodiments, a user (such as an administrator of the system 100) may be capable of controlling the operation of the system 100 directly through one of the servers, such as the conversion server 110 or the data server 140. Each of the computing devices, including the conversion server 110, the data server 140 and the remote computing devices 150, can be implemented by one or more computers, which can be a desktop computer, a laptop computer, a tablet, a mobile device or any other computing system that is capable of executing the software applications of the system 100 directly or remotely. In certain embodiments, one or more of the computing devices may be implemented by virtual machines. The network 130 may be a wired or wireless network, and may be of various forms such as an Internet, a Local Area Network (LAN), a Wide Area Network (WAN), or a cloud network. In certain embodiments, the system 100 may include multiple networks for performing the interconnection of the computing devices.

The conversion server 110 is a computing device which includes the necessary hardware and software components to function as a server and perform the GRC operation of the system 100. In certain embodiments, the conversion server 110 includes, among other hardware and software components not shown in FIG. 1, a processor 112, a memory 114, and a storage device 116. In certain embodiments, the system 100 may include one conversion server 110 as shown in FIG. 1. Alternatively, the conversion server 110 may be implemented by multiple computing devices, where the hardware and software components may be distributed among the computing devices to perform the conversion operation of the conversion server 110.

The processor 112 is a processor which is configured to control operation of the conversion server 110, and to execute the software applications for the conversion server 110. In certain embodiments, the conversion server 110 may run on more than one processor or central processing unit (CPU) as the host processor, such as two CPUs, four CPUs, eight CPUs, or any suitable number of CPUs.

The memory 114 may be a volatile memory, such as the random-access memory (RAM), for storing the data and information during the operation of the conversion server 110. In certain embodiments, the memory 114 is in communication with the processor 112 through a system bus (not shown).

The storage device 116 may be a non-volatile data storage media for storing software applications of the conversion server 110. The software applications may be in the form of computer executable code or instructions, which may be executed at the processor 112. Example of the storage device 116 may include hard drives, floppy disks, optical drives, flash memory, memory cards, USB drives, or any other types of data storage devices. In certain embodiments, the conversion server 110 may include multiple storage devices 116, and each of the storage devices 116 may be a local storage physically located in the conversion server 110, or an external storage physically located outside the conversion server 110. For example, the storage device 116 may be a network storage being connected to the conversion server 110 via the network 130.

As shown in FIG. 1, the software applications stored in the storage device 116 may include: an operating system (OS) 120, a conversion module 122, and a modification tool 124. In certain embodiments, the storage device 116 may store other software applications of the conversion server 110. In certain embodiments, some of the software applications may be combined to form a package software program or multiple programs.

The OS 120 may be collective management software managing the operation of the conversion server 110. For example, the OS 120 can include a set of functional programs that control and manage operations of the devices connected to the conversion server 110, such as providing the server function such that the client computers (i.e., the remote computing devices 150) and other servers (e.g., the data server 140) may connect to the conversion server 110 via the network 130. The set of application programs provide certain utility software for the user to manage the conversion server 110. In certain embodiments, the OS 120 is operable to multitask, i.e., execute computing tasks in multiple threads, and may be operating system of different platforms. For example, the OS 120 may be commercial OS package software systems such as Microsoft Windows, Macintosh OSX, UNIX, LINUX, iOS, Android, etc.

The conversion module 122 is a software module to provide the GRC capabilities for the system 100. For example, a user may use the system 100 to create a plurality of objects, and each of the objects may include certain data that may be used to create a CAD model of a geometric shape design, or to display an existing geometric shape design of the object. In certain embodiments, a master representation (MR) may be defined to represent one or more objects. For example, a MR may represent a single object, or may represent an assembly of multiple objects. The MR is a complete, unambiguous, and compact representation of the product design, which contains sufficient information to generate any other representation of the object or objects. In addition, the MR can host associated attribute information of the design of the object or objects. In certain embodiments, any additional information added in any stage can be kept with the MR. In certain embodiments, each MR has a special identification (SI). Since the MR may represent a single object or an assembly of multiple objects, each object in the MR may have an individual identification which is unique within the MR. In contrast to the MR, an individual representation (IR) is a particular representation which is individualized based on the need of the users. In certain embodiments, different users may request different representations for the same object, and for each user, an IR may be generated from the MR to fit the particular need of the user.

In certain embodiments, when the object is a three-dimensional (3D) object, BREP may be used as the MR to precisely represent geometry of the 3D object. In this case, each topology Entity of BREP Body (such as Face, Edge, Vertex, etc) has a unique identifier. Non-geometry information such as Product Manufacturing information (dimension, datum plane, surface finish, heat treatment, material properties, etc) data can be associated to any entity. Mechanism is established to maintain entity ID during BREP body operations such as copying, Boolean operation, Direct Face Modeling, etc., so that the information attached to an entity can be maintained.

As described above, the conversion module 122 is a software module to provide the GRC capabilities for the system 100. Specifically, the conversion module 122 may perform conversion between the MR and the IR of the objects. For example, the conversion module 122 may convert the MR of at least one selected object to IR by obtaining, from the data store 148 of the data server 140, the master representation information corresponding to the MR of the at least one selected object, and then converting the master representation information obtained to individual representation information, which corresponds to the IR of the at least one selected object. Specifically, for all the data stored in the data server 140, each object may have a corresponding MR. However, a user may request a specific IR, which may represent one or more selected objects from the objects. When an object is selected, the conversion module 122 may obtain, from the data server 140, the master representation information corresponding to the MR of the selected object, and then generate individual representation information based on the master representation information obtained. The individual representation information being generated corresponds to the IR of the selected object. When multiple objects are selected, the conversion module 122 may obtain, from the data server 140, the master representation information corresponding to the MRs of the selected objects, and then generate individual representation information based on the master representation information obtained. The individual representation information being generated corresponds to the IR of the selected objects as a whole.

On the other hand, the conversion module 122 may also convert the IR of at least one selected object back to MR by receiving individual representation information corresponding to an IR of the at least one selected object, and then converting the individual representation information received to the master representation information corresponding to the MR. In certain embodiments, the individual representation information received by the conversion module 122 may be modified individual representation information corresponding to the IR of the at least one selected object, which the conversion module 122 has converted in an earlier process. Specifically, when the conversion module 122 generates the individual representation information corresponding to an IR, the conversion module 122 may send the individual representation information together with the SI to one of the remote computing device 150 through the network 130, such that the user may modify the individual representation information. After the individual representation information has been modified, the modified individual representation information and the SI may be sent back to the conversion module 122, such that the conversion module 122 may convert the modified individual representation information received to the master representation information. In certain embodiments, the conversion module 122 may convert the modified individual representation information received to updated master representation information by: locating the master representation information corresponding to the SI in the data store 148; and then updating the master representation information using the modified individual representation information received to generate the updated master representation information.

As described above, the MR is a complete, unambiguous, and compact representation of the product design, which contains sufficient information to generate any other representation of the object or objects. In contrast, the IR is a particular representation which is individualized based on the need of the users. In certain embodiments, the master representation information corresponding to a MR of an object (or multiple objects) may include all geometry data and non-geometry data of the object (or objects) being represented by the MR. In certain embodiments, the non-geometry data may associate to one or more of the objects, which may be a 3D object or a non-3D object, within the MR. However, different users may request different IRs for the same object (or objects), such that the individual representation information of the same object (or objects) may include different data. Thus, the conversion module 122 may, based on the request received from the user, generate corresponding individual representation information based on the master representation information, such that the user may perform operation on the individual representation that fits the need. Details of the conversion between the MR and the IR will be described later.

The modification tool 124 is a software tool module which is used for modifying the individual representation information. Specifically, when the conversion module 122 generates the individual representation information corresponding to an IR of the selected object or objects, the conversion module may send the individual representation information as well as the modification tool 124 to the remote computing device 150 through the network 130, such that the modification tool 124 is executable by the remote computing device 150 for the user to operate in order to modify the individual representation information. In certain embodiments, the modification tool 124 may be a CAD software, a CAE software or other software tools developed for users to modify a specific individual representation information for needed functions. For example, a custom-made Product Compose Software may be provided to provide assembly composing features to combine existing components into a product, and display it, without having the complex CAD and/or CAE features. In certain embodiments, the system 100 may provide multiple modification tools 124. Each modification tool 124 may be a different software application suitable to modify the individual representation information corresponding to a particular type of individual representation. In certain embodiments, when the user requests for a particular type of individual representation, the conversion module 122 may select one of the multiple modification tools 124 which is suitable for modifying the corresponding individual representation information, and then send the selected modification tool 124 together with the individual representation information being converted and the SI to the remote computing device 150, such that the modification tool 124 being sent to the remote computing device is executable by the remote computing device 150. In certain embodiments, the modification tool 124 may be pre-installed in the remote computing device 150 to be executable by the remote computing device 150, such that the user may execute the modification tool 124 to modify the individual representation information without any additional installation process.

When the modification tool 124 is executed at the remote computing device 150, the user may perform operation to conduct a modification action to the IR. As discussed above, the individual representation information may include geometry data and non-geometry data of the object or objects being represented by the IR. In response to receiving such modification action, the modification tool 124 may modify the individual representation information accordingly to generate modified individual representation information, and then send the modified individual representation information back to the conversion module 122 for further processing.

The data server 140 is a computing device which includes the necessary hardware and software components to function as a server providing data for the system 100. In certain embodiments, the data server 140 includes, among other hardware and software components not shown in FIG. 1, a processor 142, a memory 144, and a storage device 146. In certain embodiments, the system 100 may include one data server 140 as shown in FIG. 1. Alternatively, the data server 140 may be implemented by multiple computing devices, where the hardware and software components may be distributed among the computing devices to perform the conversion operation of the conversion server 110. Further, in certain embodiments, the data server 140 and the conversion server 110 may be implemented by one single server computing device.

The processor 142 is a processor which is configured to control operation of the data server 140, and to execute the software applications for the data server 140. In certain embodiments, the data server 140 may run on more than one processor or central processing unit (CPU) as the processor, such as two CPUs, four CPUs, eight CPUs, or any suitable number of CPUs.

The memory 144 may be a volatile memory, such as the random-access memory (RAM), for storing the data and information during the operation of the data server 140. In certain embodiments, the memory 144 is in communication with the processor 142 through a system bus (not shown).

The storage device 146 may be a non-volatile data storage media for storing software applications and data of the data server 140. The software applications may be in the form of computer executable code or instructions, which may be executed at the processor 142. Example of the storage device 146 may include hard drives, floppy disks, optical drives, flash memory, memory cards, USB drives, or any other types of data storage devices. In certain embodiments, the data server 140 may include multiple storage devices 146, and each of the storage devices 146 may be a local storage physically located in the data server 140, or an external storage physically located outside the data server 140. For example, the storage device 146 may be a network storage being connected to the data server 140 via the network 130.

As shown in FIG. 1, the software applications stored in the storage device 146 may include a data store 148. The data store 148 is a database configured to store a plurality of information of the system 100. Examples of the information may include, without being limited to, master representation information of the MRs of the objects. As shown in FIG. 1, the master representation information stored in the data store 148 may correspond to multiple MRs. Other information that may be stored in the data store 148 may include object information of the objects, component information of the components, connector information of a plurality of connectors on the components, and other information relevant to the operation the system 100. As shown in FIG. 1, the data store 148 is located in the storage device 146 of the data server 140, and is thus a virtual database that resides in the data server 140 and remotely from the conversion server 110. In certain embodiments, when the data server 140 and the conversion server 110 are implemented by one single server computing device, the data store 148 may be a local database, which is stored in the storage device of the server computing device together with the conversion module 122 and the modification tool 124. In certain embodiments, the data store 148 and the information stored therein may be in the form of hard coded information in computer software, an XML file or other file format, a real database on a database server or on a cloud server.

The remote computing devices 150 are computing devices remotely connected to the server computing devices (i.e., the conversion server 110 and the data server 140) through the network 130. In certain embodiments, each of the remote computing device 150 includes the necessary hardware and software components to function as a client computer, such that the user may perform operation therethrough. As shown in FIG. 1, each of the remote computing device 150 may include, among other hardware and software components not shown in FIG. 1, a processor 152, a memory 154, and a storage device 156. In certain embodiments, each of the remote computing devices 150 may be a thin client or zero client computer.

The processor 152 is a processor which is configured to control operation of the remote computing devices 150, and to execute the software applications for the remote computing devices 150. In certain embodiments, the remote computing devices 150 may run on more than one processor or central processing unit (CPU) as the processor, such as two CPUs, four CPUs, eight CPUs, or any suitable number of CPUs.

The memory 154 may be a volatile memory, such as the random-access memory (RAM), for storing the data and information during the operation of the remote computing devices 150. In certain embodiments, the memory 154 is in communication with the processor 152 through a system bus (not shown).

The storage device 156 may be a non-volatile data storage media for storing software applications and data of the remote computing devices 150. The software applications may be in the form of computer executable code or instructions, which may be executed at the processor 152. Example of the storage device 156 may include hard drives, floppy disks, optical drives, flash memory, memory cards, USB drives, or any other types of data storage devices. In certain embodiments, the remote computing devices 150 may include multiple storage devices 156, and each of the storage devices 156 may be a local storage physically located in the remote computing devices 150, or an external storage physically located outside the remote computing devices 150. For example, the storage device 156 may be a network storage being connected to the remote computing devices 150 via the network 130.

As shown in FIG. 1, the software applications stored in the storage device 156 may include an OS 160, a CAD software 162, a CAE software 164 and other software tools or modules not specifically shown in FIG. 1. The OS 160 may be collective management software managing the operation of the remote computing device 150, which may be similar to the OS 120 of the conversion server 110. Thus, details of the OS 160 are not elaborated.

The CAD software 162 may be a software application for the user to implement a geometric model for each of a plurality of objects so as to create a CAD model of a geometric shape design, or to display an existing geometric shape design. In certain embodiments, each object may be formed by one or more components. For example, an object may be formed by a single component, or may be formed by an assembly of multiple components. In certain embodiments, the geometric model of each of the objects is a solid shape model, a polygonal shape model, a point cloud set model, or a combination thereof. In certain embodiments, when an object includes multiple components, the components may or may not be represented in the same type of model. In other words, the geometric model of an object may be formed by components represented in different types of models.

In certain embodiments, the CAD software 162 has a standard user interface (UI), which is configured to receive one or more UI commands from the user. In certain embodiments, the standard UI may receive the one or more UI commands based on user input. In certain embodiments, the UI commands may be a modification action to modify geometry, position or other information of a component, or may be a UI action to drag and drop an object or a component. For example, when the user of the CAD software 162 selects and drags an object or a component through the standard UI of the CAD software 162, the standard UI may generate a corresponding UI command based on the input (selecting and dragging) of the user. In certain embodiments, the user input may be performed by an input device (not shown) of the remote computing device 150. Examples of the input device may include, without being limited to, a keyboard, a mouse, a touching pad, virtual reality device, or any other input devices.

The CAE software 164 may be a software application to perform a CAE process and create or modify non-geometry engineering data. In certain embodiments, the CAE software 164 may be independent from the CAD software 164 and other modules. In certain embodiments, the CAE software 164 and the CAD software 162 may be combined to form a package of software. Examples of the CAE process may include, without being limited to, finite element analysis, stress analysis, thermal analysis, electromagnetics analysis, fluid dynamic analysis, kinematics analysis, collision analysis, dynamic analysis, or any other CAE process or simulation.

It should be noted that, in certain embodiments, the CAD software 162, the CAE software 164, and/or other software tools or modules may be the modification tool 124 pre-installed in the remote computing device 150. In certain embodiments, the CAD software 162, the CAE software 164 and/or other software tools or modules may each be a part of the modification tool 124, which are sent by the conversion module 122 from the conversion server 110 to the remote computing device 150 for execution.

As disclosed above, the system 100 may have one or more computing devices, which may include at least one server computing device (which functions as a server computer) and at least one remote computing device (which functions as a client computer) for implementing the client-server structure. In certain embodiments, the at least one remote computing device and the at least one server computing device may be implemented by the same computing device. In other words, the system 100 may have one single computing device, which includes all software components of the server computing device and the remote computing device.

Figure 2:
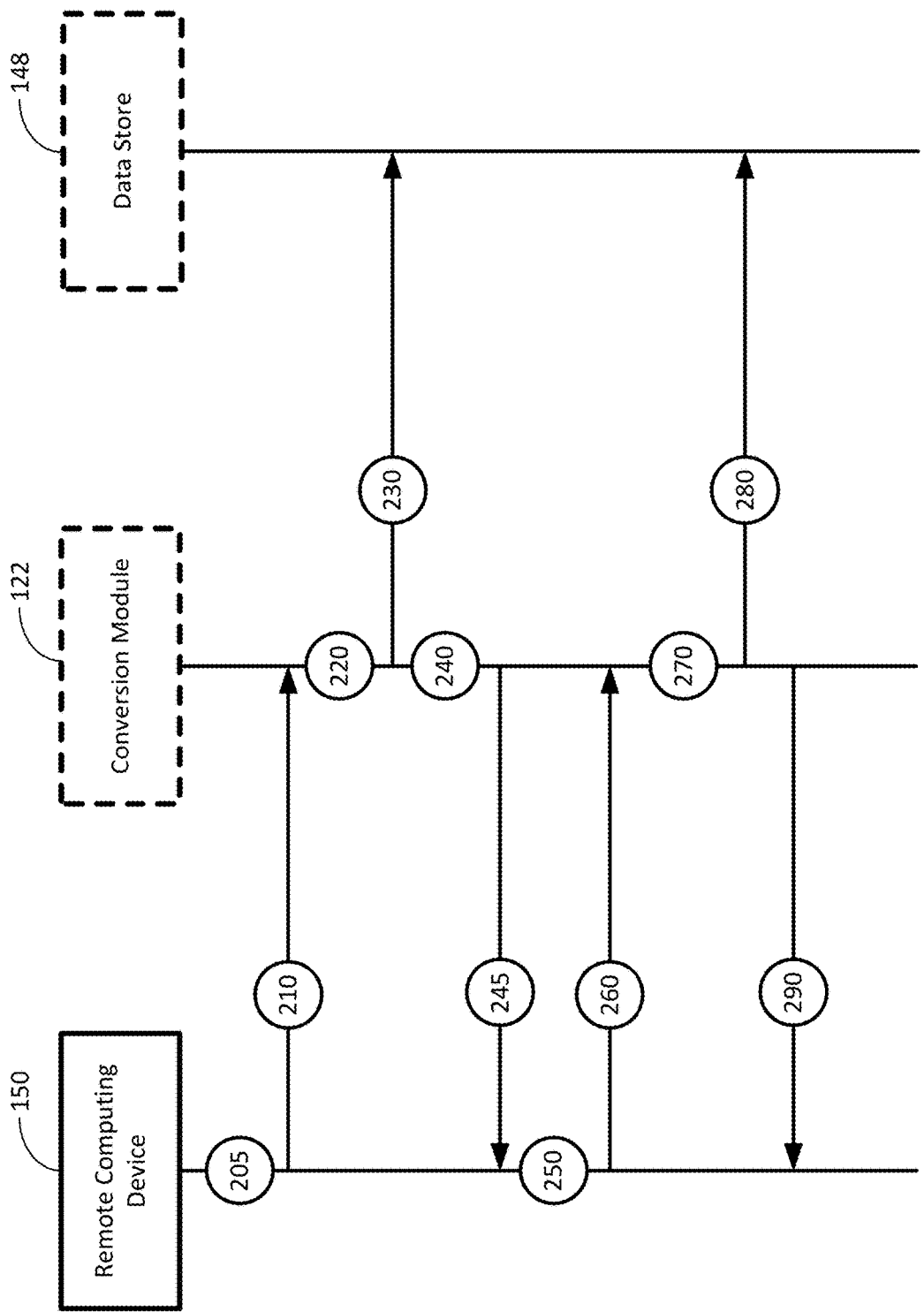
FIG. 2 schematically shows a flowchart of the operation of the system according to certain embodiments of the present invention.

FIG. 2 schematically shows a flowchart of operation of the system according to certain embodiments of the present invention. Specifically, the flowchart as shown in FIG. 2 is an example of a user requesting an IR from a remote computing device 150, and the conversion server 110, in response to the request of the IR, retrieves the MR and converts the MR to the IR being requested for the user. Then the user, after receiving the requested IR, modifies the IR and send the modified individual representation information back to the conversion server 110, such that the conversion module 122 at the conversion server 110 may convert the IR back to the MR.

As shown in FIG. 2, at procedure 205, a user at one of the remote computing devices 150 may operate the remote computing device 150 to generate a request for an IR. Specifically, the user may select one or more objects through browsing MR in the data store 148 such that the IR of the selected object (or objects) is requested. Upon receiving the operation of the user, at procedure 210, the remote computing device 150 generates the request to the conversion server 110. The IR being indicated by the request may correspond to one or more of the objects being selected by the user. As described above, each MR of the objects may have a SI to identify the master representation information corresponding to the MR of the objects. Thus, the request being generated may include information of the SI such that the master representation information may be identifiable to correspond to the object (or objects) whose IR is subject to the request.

At procedure 220, the conversion module 122 at the conversion server 120 receives the request from the remote computing device 150, and processes the request. At procedure 230, the conversion module 122 retrieves the master representation information from the data store 148 of the data server 140 based on the SI being included in the request using a unique identification mechanism (UIM). Specifically, the conversion module 122 may use the UIM to locate the MR of each selected object stored in the data store 148.

When the conversion module 122 retrieves the master representation information from the data store 148, at procedure 240, the conversion module 122 may retrieve, based on the information indicated by the request, information necessary for the IR from the master representation information of the selected object or objects, and then generate the individual representation information using the retrieved information necessary for the IR. For example, the IR may include only a portion of the geometry data when the request may indicated that such portion of the geometry data is necessary. Alternatively, the IR may include only all of the geometry data and a portion of the non-geometry data when the request may indicate that such geometry and non-geometry data are necessary. It should be noted that the IR may also include the SI of the selected object (or objects).

At procedure 245, the conversion module 122 may send the individual representation information being generated and the SI to the remote computing device 150 through the network 130 in response to the request. The individual representation information being generated is sent together with the SI such that the remote computing device 150 may verify the individual representation information to be corresponding to the object (or objects) whose IR is subject to the request. In certain embodiments, the conversion module 122 may send the modification tool 124 together with the individual representation information to the remote computing device 150.

Upon receiving the individual representation information and the modification tool 124, at procedure 250, the remote computing device 150 may perform operation to the IR. It should be noted that, in certain embodiments, the operation performed by the user may include modifying the individual representation information by the modification tool 124 such that the user may modify the IR accordingly, or may include other operation without modifying the individual representation information. If modifying the individual representation information is necessary, the modification tool 124 needs to be executed at the remote computing device 150.

Specifically, at procedure 250, when the user may perform one or more modification actions to the IR using the modification tool 124 executed at the remote computing device 150, the user may have different purposes in modifying the IR. For example, the modification action to the IR may be an action of updating the MR of the selected object (or objects), an action of deleting the MR of the selected object (or objects), or an action of creating a new MR based on the modified IR of the selected object (or objects). In response to the modification action, the modification tool 124 modifies the individual representation information to generate the modified individual representation information. Then, at procedure 260, the modification tool 124 sends the modified individual representation information and the SI back to the conversion module 122 at the conversion server 120.

Upon receiving the modified individual representation information, at procedure 270, the conversion module 122 converts the modified individual representation information received to the master representation information. Then, at procedure 280, the conversion module 122 may store the converted master representation information in the data store 148 of the data server 140. In certain embodiments, specifically, the conversion module 122 may convert the modified individual representation information received to updated master representation information by locating the master representation information corresponding to the SI in the data store 148 using the UIM, and then updating the master representation information using the modified individual representation information received to generate the updated master representation information.

As described above, a user may have different purposes in modifying the IR. For example, in certain embodiments, when the modification action is the action of updating the MR of the selected object (or objects), the conversion module 122 may, at procedure 270, convert the modified individual representation information received to updated master representation information, which is used for updating the existing master representation information of the MR of the selected object (or objects). Then, the conversion module 122 may, at procedure 280, store the updated master representation information in the data store 148 to replace the master representation information of the MR of the selected object (or objects).

In certain embodiments, when the modification action is an action of deleting some of the selected objects from the MR, the conversion module 122 may, at procedure 270, convert the modified individual representation information received to updated master representation information, where the information corresponding to the selected object (or objects) to be deleted may be deleted from the updated master representation information. Then, the conversion module 122 may, at procedure 280, store the updated master representation information in the data store 148 to replace the master representation information of the MR. In this case, the selected object (or objects) to be deleted may be removed from the MR.

Alternatively, in certain embodiments, when the modification action is the action of creating a new MR using the modified IR of the selected object (or objects), the conversion module 122 may, at procedure 270, convert the modified individual representation information received to new master representation information, which is used for creating a new MR corresponding to the selected object (or objects). Then, the conversion module 122 may, at procedure 280, store the new master representation information in the data store 148 as the master representation information of the new MR of the selected object (or objects).

In certain embodiments, after the converted master representation information is stored in the data store 148, at procedure 290, the conversion module 122 may send change notifications to the remote computing devices 150 to notify the users about the change of the master representation information. It should be noted that the notifications may be sent to all remote computing devices 150 of the system 100. In this case, the notifications are sent not only to the remote computing device 150 at which the user performed modification to the IR, but also to other remote computing device 150 where other users may be interested in retrieving the modified data. Thus, one of the other users may perform a request for an IR to the modified data through the procedures 205 to 250 as shown in FIG. 2, which is not hereinafter elaborated.

Figure 3A:
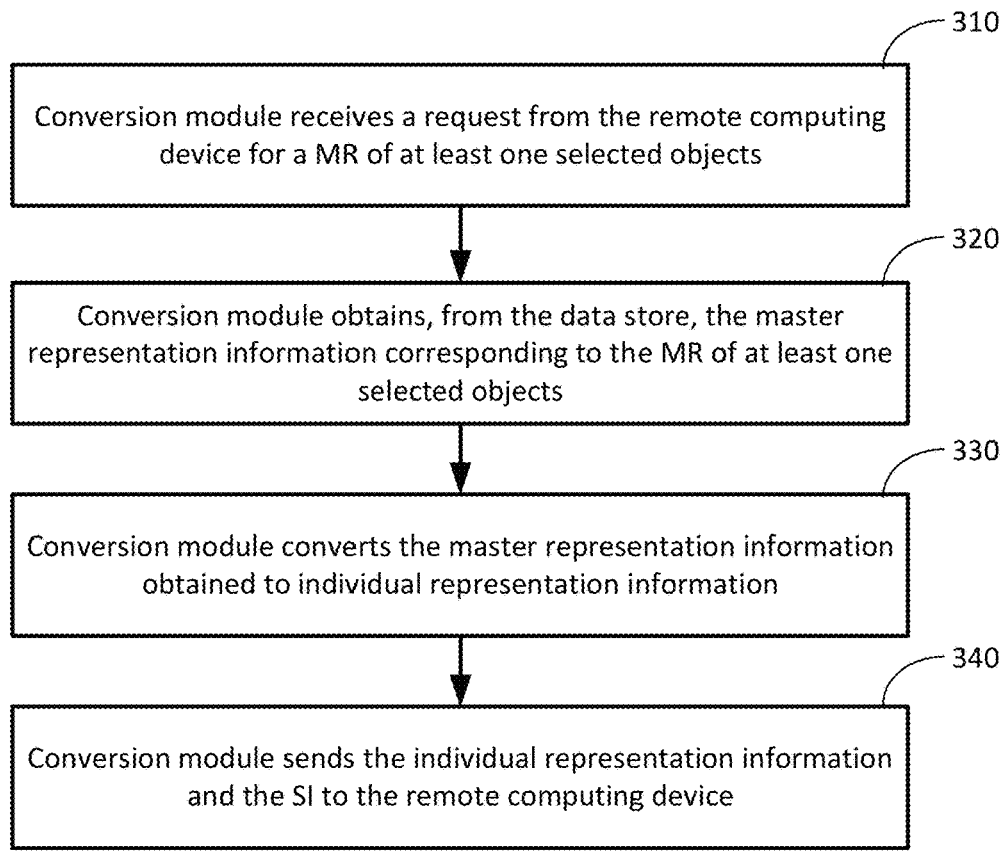
FIG. 3A shows a flowchart of the conversion of master representation information to individual representation information by the conversion module according to certain embodiments of the present invention.

FIG. 3A shows a flowchart of the conversion of master representation information to individual representation information by the conversion module according to certain embodiments of the present invention. At procedure 310, the conversion module 122 receives a request from the remote computing device 150 for a MR of at least one selected objects. In certain embodiments, the request may include a SI to identify the master representation information corresponding to the master representation of the at least one selected object. At procedure 320, the conversion module 122 obtains, from the data store 148, the master representation information corresponding to the MR of at least one selected objects being requested. In certain embodiments, the conversion module 122 may obtain the master representation information based on the SI of the request using the UIM. At procedure 330, the conversion module 122 converts the master representation information obtained to individual representation information. At procedure 340, the conversion module 122 sends the individual representation information and the SI to the remote computing device 150. In certain embodiments, the modification tool 124 is also sent together with the individual representation information and the SI.

Figure 3B:
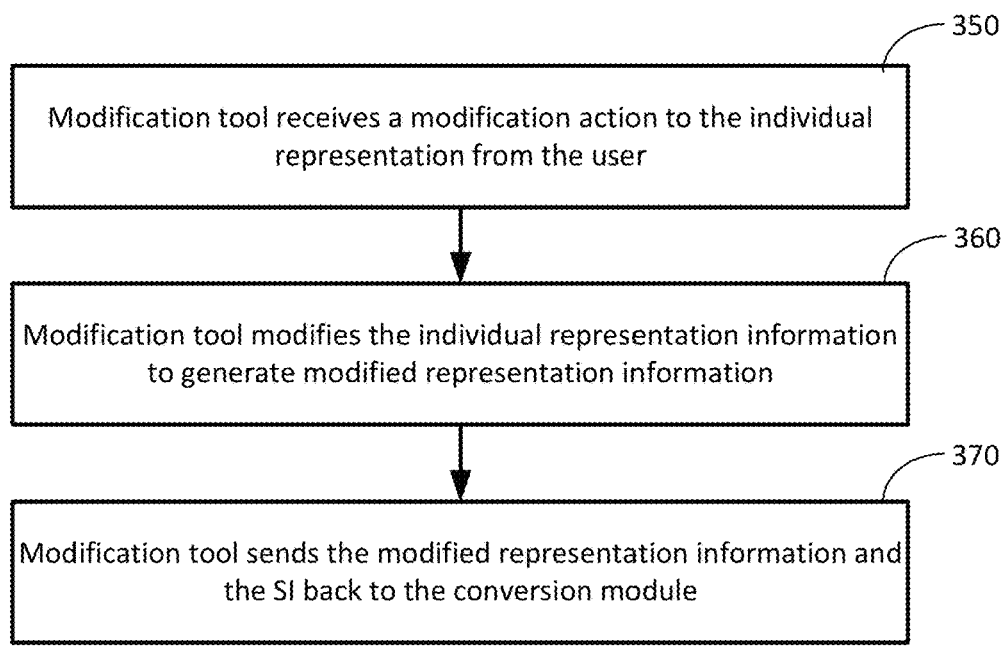
FIG. 3B shows a flowchart of the modification to individual representation information by the modification tool executed at the remote computing device according to certain embodiments of the present invention.

FIG. 3B shows a flowchart of the modification to individual representation information by the modification tool executed at the remote computing device according to certain embodiments of the present invention. At procedure 350, the modification tool 124 receives a modification action to the individual representation from the user. At procedure 360, the modification tool 124 modifies the individual representation information to generate modified individual representation information. At procedure 370, the modification tool 124 sends the modified representation information and the SI back to the conversion module 122 for further processing.

Figure 4:
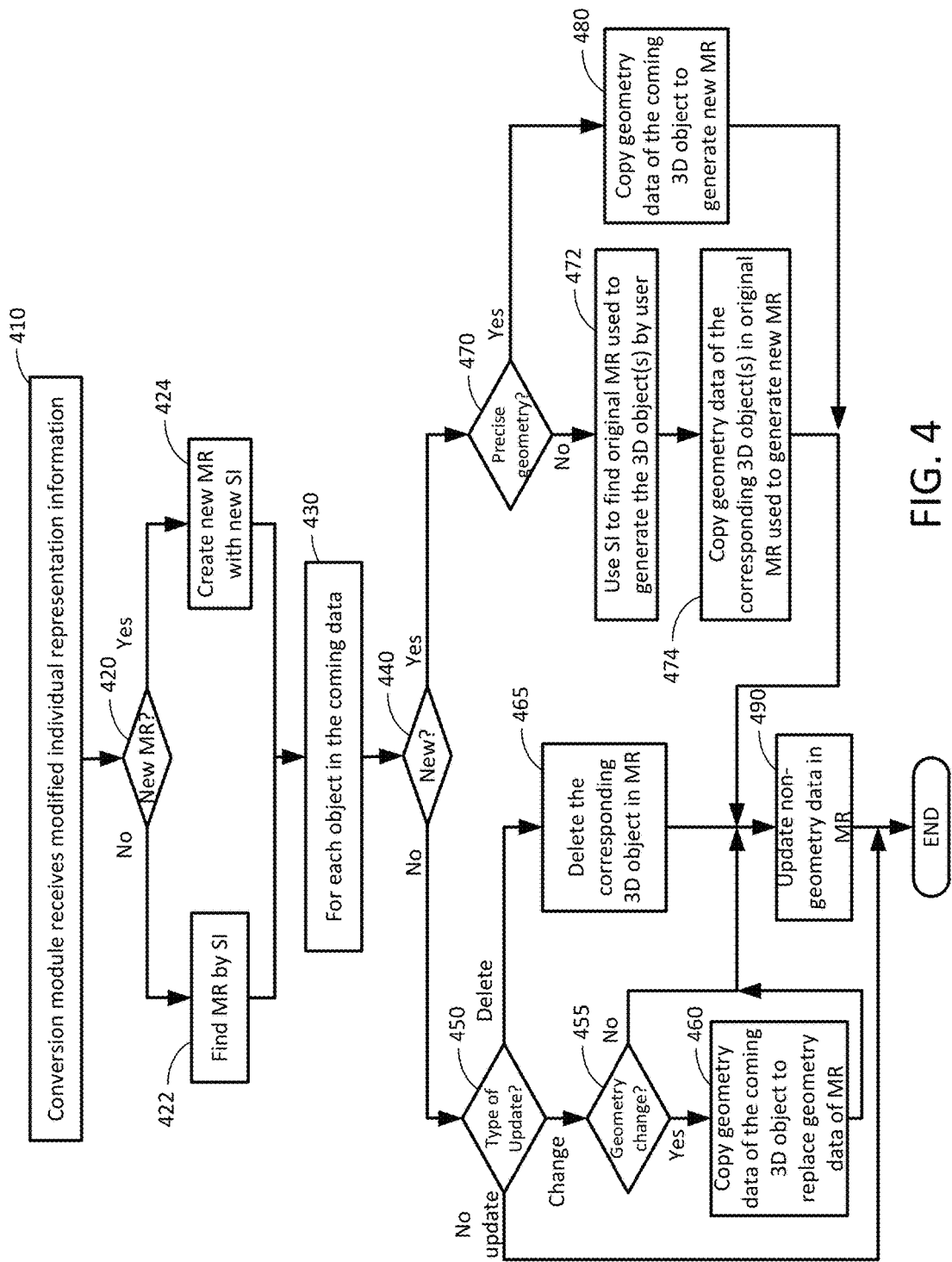
FIG. 4 shows a flowchart of the conversion of individual representation information back to master representation information by the conversion module according to certain embodiments of the present invention.

FIG. 4 shows a flowchart of the conversion of individual representation information back to master representation information by the conversion module according to certain embodiments of the present invention. It should be noted that the flowchart merely provides an example of how the conversion of the individual representation information back to master representation information is performed by the conversion module 122, and is not intended to limit the operation of the conversion module 122.

At procedure 410, the conversion module 122 receives modified individual representation information from the remote computing device 150. At procedure 420, the conversion module 122 checks the modified individual representation information to determine whether it is for creating a new MR, or for updating an existing MR. If the modified individual representation information is for updating an existing MR, at procedure 422, the conversion module 122 may find the MR by the SI being included in the modified individual representation information. If the modified individual representation information is for creating a new MR, at procedure 424, the conversion module 122 may create the new MR with a new SI.

It should be noted that the action of creating a new MR may be creating a brand new object from scratch without using an existing individual representation, or may be creating a new MR by modifying an existing individual representation. In certain embodiments, the action of creating a new MR may be combining two or more individual representations, where each individual representation may be existing or newly created.

At procedure 430, the conversion module 122 checks for each object in the coming data of the modified individual representation information. It should be noted that the modified individual representation information may correspond to one or more object. At procedure 440, the conversion module 122 checks whether the object is a new object. When the object is an existing object (i.e., the object which has master representation information of a corresponding MR stored in the data store 148), the conversion module 122 goes to procedure 450. When the object is a new object (i.e., no corresponding MR information is stored in the data store 148), the conversion module 122 moves to procedure 470.

At procedure 450, the conversion module 122 checks the type of update for the existing object. The type of update may include, without being limited to, one of the following actions: changing the geometry data of the object, deleting the object, changing the non-geometry data corresponding to the object, or doing nothing (i.e., no update) to the object. Further, if there is no update for the object, the procedure ends. It should be noted that, if multiple objects exists in the modified individual representation information, the conversion module 122 may moves back to procedure 430 to perform other objects in the incoming data.

If the update for the object is about changing the geometry data of the object, at procedure 455, the conversion module 122 may determine there is a geometry change, and move to procedure 460. At procedure 460, the conversion module 122 copies the geometry data of the coming 3D object to replace the geometry data of the existing object in the existing master representation information of the MR.

If the update for the object is about deleting the object, at procedure 465, the conversion module 122 deletes the information of the corresponding 3D object in the existing MR.

If the update for the object is about changing the non-geometry data of the object, at procedure 455, the conversion module 122 may determine there is no geometry change, and move to procedure 490. At procedure 490, the conversion module 122 updates the non-geometry data in the existing master representation information of the MR.

On the other hand, at procedure 470, the conversion module 122 checks whether the new object has the precise geometry data. If the new object does not have the precise geometry data, at procedure 472, the conversion module 122 uses the SI to find the original MR of the object (or objects) being used to generate the incoming 3D object by the user. Then, at procedure 474, the conversion module 122 copies the geometry data of the corresponding 3D object (or objects) in the original MR being used to generate the master representation information of the new MR. If the new object has the precise geometry data, the conversion module 122 may copy the geometry data of the incoming 3D object (or objects) to generate the master representation information of the new MR directly without referring back to the original MR. Further, if there is incoming non-geometry data corresponding to the new MR, the conversion module 122 may move to procedure 490 to update the non-geometry data in the master representation information of the new MR.

EXAMPLES

Several examples of the operation of the system 100 are provided as follows according to certain embodiments of the present invention. It should be appreciated that the examples are merely provided as embodiments of the present invention, without limiting the conversion operation performed by the conversion module 122.

Example 1: Creating a New MR

In this example, the user intends to create a new design and adds the design to the server. At the server side, the conversion module 122 creates the MR by extracting the geometry data (and other information, if any) for the new design, and assign an SI by the UIM to the new MR. After the new MR is created, the user may get the assigned SI for the new MR returned from the server.

Figure 5:
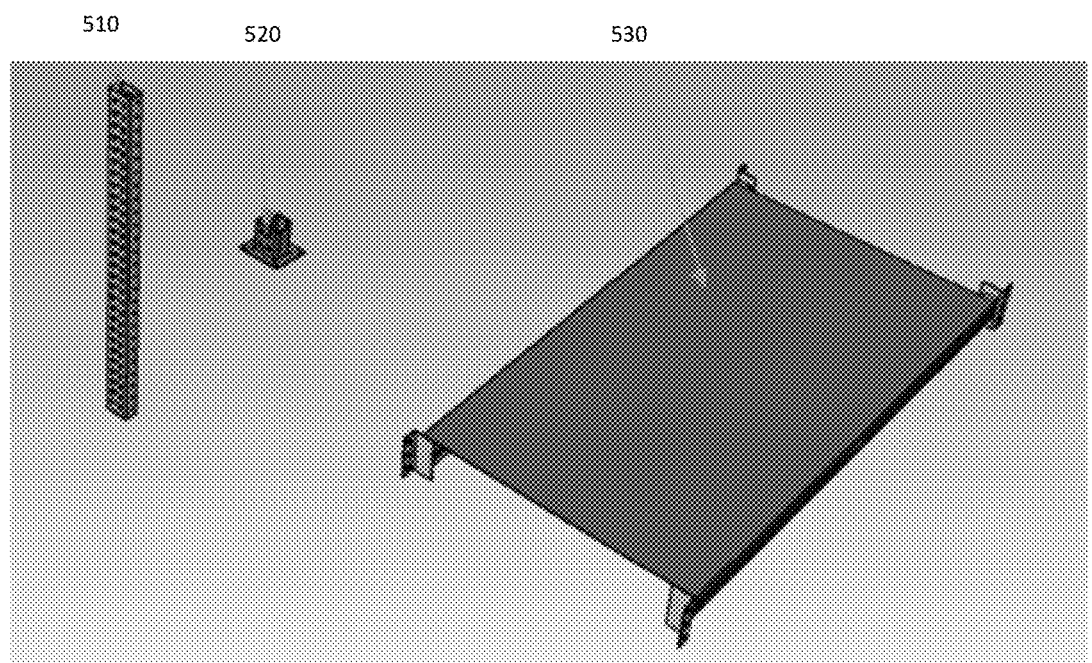
FIG. 5 schematically shows an example of creating a new MR for a metal shelf according to certain embodiments of the present invention.

FIG. 5 schematically shows an example of creating a new MR for a metal shelf according to certain embodiments of the present invention. As shown in FIG. 5, the components of the metal shelf include a rail 510, a base 520 and a shelf body 530, all created by the user (i.e., a designer). Each component of the metal shelf is a family of parts, and can be used to create a specific size of the component based on the input parameters. For instance, the size of the shelf body 530 can be 48×48 inch, 36×36 inch, 24×24 inch, 36×24 inch, etc. Customers can configure a metal shelf by combining certain number of each of the 3 components (i.e., the rail 510, the base 520 and the shelf body 530) with different parameters, such as the number of levels, height/width/length and others. The designer creates the 3 components at a remote computing device 150, and sends the information (i.e., the modified individual representation information) of the 3 components to the conversion server 110. At the conversion server 110, the conversion module 122 may create, for each component, new master representation information of a new MR by extracting the geometry data and other information (i.e., non-geometry data) of the component from the modified individual representation information, and store the converted master representation information of the components in the data store 148 as the new MRs. For example, the conversion module 122 may create new MRs (MR_Rail, MR_Base, MR_Shelf) by extracting the geometry information and other information such as materials (Steel, Aluminum, etc). In this case, the conversion module 122 may also assign an identifier (SI) to each MR.

Example 2: Modifying an Existing MR

In this example, the user intends to request an IR (with complete precise geometry data and other related non-geometry data) by using the SI. At the server side, the conversion module 122 uses the UIM to find the MR, and then generates the corresponding individual representation information being requested, with the SI information being embedded therein, and then sends the information back to the user. Thus, the user may modify the requested information such as the geometry data and other non-geometry data. In certain embodiments, the user may also browse the data stored in the data store 148 or perform some search mechanisms to find the desired objects, and/or add additional information in a related modification tool 124 (i.e., a software application). After the user modifies the information, the user may send the modified information back to the conversion server 110 with the SI. At the server side, the conversion module 122 will check the user's authority for modifying the MR. If the user is allowed to modify the MR, the conversion module 122 may use the UIM to find the MR according to the SI, and then update the MR by converting the modification information back to the master representation information, and add the additional information to the updated MR. After the updated MR is stored in the data store 148, all users the user may get updated MR from the server.

In this example, the metal shelf as shown in FIG. 5 is used. The metal shelf has three components, including the rail 510, the base 520 and the shelf body 530. The MRs for the components have been created, including MR_Rail (SI=SI_Rail), MR_Base (SI=SI_Base), and MR_Shelf (SI=SI_Shelf).

Figure 6:
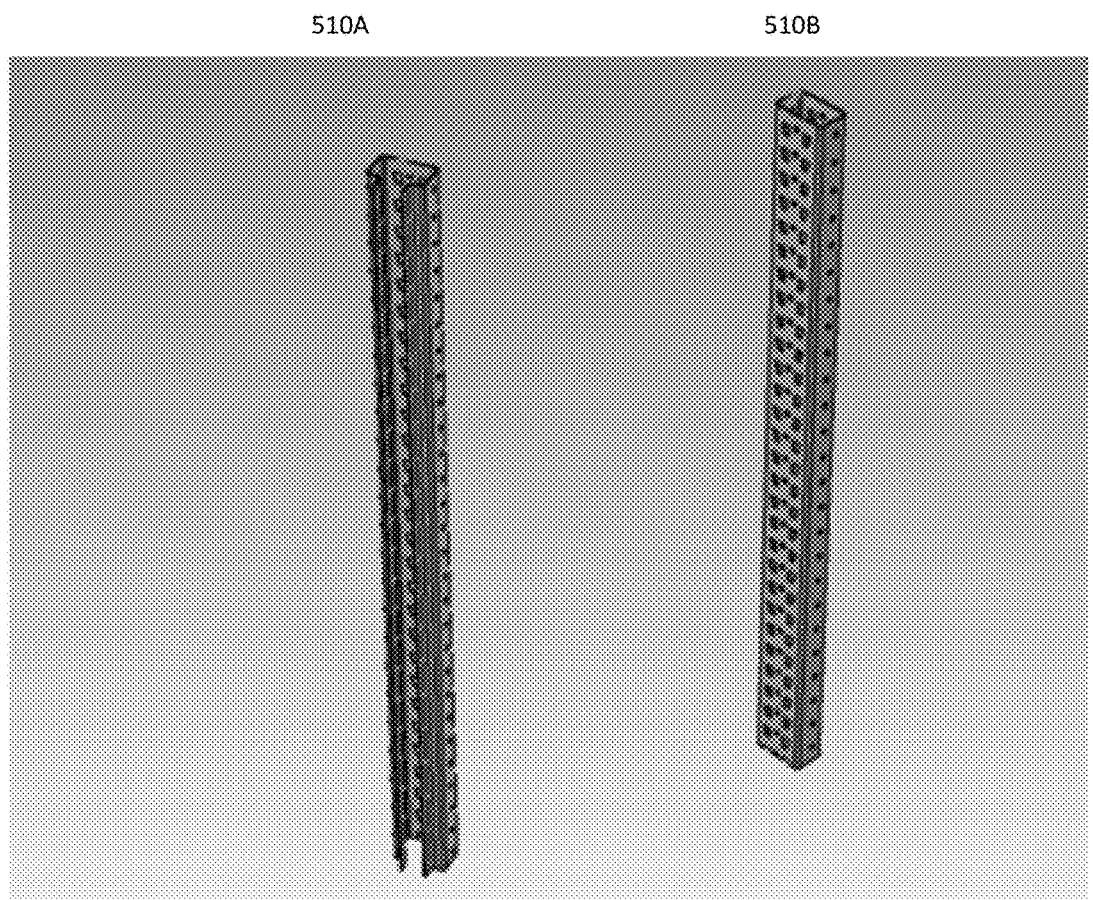
FIG. 6 schematically shows an example of two different types of rails according to certain embodiments of the present invention.

FIG. 6 schematically shows an example of two different types of rails according to certain embodiments of the present invention. In this case, the user (i.e., a designer) wants to modify the current rail design, which has a squared cross section 510B, by changing the squared cross section to an open cross section 510A. The designer can use the SI returned from the conversion server 110 when he added the MR of the rail component to the server, or use other ways to request from the server to generate a precise geometry representation for a Squared Rail 510B. At the server side, the conversion module 122 will generate an IR including the geometry data and other related data for the designer for modification. The designer changes the geometry of the rail 510B to have an open cross section 510A in a CAD software. The designer can also add additional information, such as available paintings of the rail etc. After the new designer is finished, the designer can request to modify the existing MR of the rail by sending back the data with the SI. After the conversion server 110 receives the request, the conversion module 122 will check the designer's authority for modifying MR. If the user is allowed to modify the MR, the conversion module 122 uses UIM to find the MR of the rail (MR_Rail) based on the SI (SI_Rail), and updates the MR in the data store 148 based on the modification information. Now the MR of the rail (MR_Rail) becomes an open cross section rail 510A as shown in FIG. 6.

Alternatively, the designer can also choose to add the new modified data of the open cross section rail 510A as a new component, and request the server to create a new MR (MR_OpenRail) instead of modifying the existing MR. This process is same as the one as described in Example 1, and is thus not elaborated herein.

Example 3: Creating a New MR by Combining Multiple Components

In this example, the user intends to create a new MR with all components as objects already created and stored in the data store 148. The user may request IRs for all components from the server. At the server side, the conversion module 122 uses the UIM to find all corresponding MRs, converts the MRs to generate the IRs being requested, and then sends the individual representation information of the IRs to the user. Then the user uses a modification tool (e.g., a Product Compose Software) to compose a new design by combining the requested components (i.e., the IRs) to create a metal shelf. After the metal shelf is created, the information of the metal shelf is sent back to the conversion module 122 to create a new MR. The user may get the assigned SI for the new MR returned from the conversion module 122 at the server, which is the same process as described in the Example 1.

Figure 7:
FIG. 7 schematically shows an example of a shelf assembly according to certain embodiments of the present invention.

FIG. 7 schematically shows an example of a shelf assembly according to certain embodiments of the present invention. As shown in FIG. 7, the shelf assembly is created using the components of the metal shelf as shown in FIG. 5, including the rail 510, the base 520 and the shelf body 530. A sales representative uses the IRs of the components obtained from the conversion server 110 to design a metal shelf (i.e., the shelf assembly 500) for a customer. For this purpose, only non-precise graphics data is needed. The user may request the IRs of non-precise graphics data and other information of the components, such as pricing etc., for the components of the metal shelf. After the sales representative receives the IRs for all 3 components in non-precise graphic format from the server, the user can compose a new metal shelf as shown in FIG. 7 in a Product Compose Software by setting parameters on each component to create desired size of the component, make multiple copies for each component, position each components by using positioning tool provided by the software or automatically position each component by embedded intelligence through Connector Technology. In addition to the geometry data, additional information can also be added to the design, such as materials, maximum load, special heat treatment etc. After the design is done, the sale representative can send the new design (i.e., the modified individual representation information of all components) back to the server. At the server side, the conversion module 122 will convert the non-precise graphics data to master representation information with precise geometry data, and extract other information to generate a new MR. The new MR for the metal shelf 500 (MR_MetalShelf) may be dependent upon or may be independent from the MRs of the original shelf components (the rail 510, the base 520, and the shelf body 530).

It is possible that the customer has some special requirements for the new Metal Shelf 500 that are not considered in the initial component designs. For instance, the shelf load or shelf size may exceed the original maximum design value, or there is special cutout on the shelf in order to fit certain space, etc. These special requirements can be added to the MR of the metal shelf 500 (MR_MetalShelf) when the sale representative sends back the new design to the conversion server. A notification event may be triggered by the conversion module 122 to notify other users of the new design. For example, after the component designer receives the event, the designer can request an IR of the metal shelf having precise geometry data as well as information regarding customer's specific requirements in order to redesign the metal shelf 500. After the designer receives the data of the IR, he can create new geometries based on customer's special requirements in a designing software such as a CAD software, and sends the design result back to the server to update the MR of the metal shelf (MR_MetalShelf). This update process is same as the one as described in Example 2, and is thus not elaborated herein. Similarly, a notification will be sent to the sale representative for customer verification and acceptance.

Example 4: IR for CAE Simulation

In this example, the user may be an engineer who intends to perform a CAE simulation, such as Finite Element Analysis (FEA), stress analysis, thermal analysis, electromagnetics analysis, fluid dynamic analysis, kinematics analysis, collision analysis, dynamic analysis, etc to make sure a design can satisfy engineering requirements. The engineer may request an IR for CAE simulation for a model with the SI. At the server side, the conversion module 122 may use the UIM to find the corresponding MRs, generate requested IR information, and send the information back to the engineer. Thus, the engineer may use the modification tool 124 (e.g., a CAE software) to perform the analysis. After the CAE process is done, the engineer may request an update of the existing MR by sending back the analysis result with the SI. The conversion module 122 may use the UIM to find the corresponding MRs based on the SI, and update the MR with the attaching analysis results For example, after a designer makes design changes and updates the MR of the metal shelf (MR_MetalShelf) in the Example 3, a notification event with SI for CAE simulation is sent to a FEA engineer. The FEA engineer will request mesh data as the IR for FEA by using the SI of the MR of the metal shelf (MR_MetalShelf). At the server side, the conversion module 122 will use UIM to find the MR (MR_MetalShelf), generate the mesh data being requested, and extract loading information specified by customers, as described in the Example 2. These data will be sent back as the individual representation information of the IR requested to the FEA engineer. The FEA engineer will load the data to FEA software to do analysis. After the analysis is done, the result such as stress distribution, weak spots, and suggested changes will be sent back to the server. At the server side, the conversion module 122 will update the MR (MR_MetalShelf) by adding the additional data. Once the conversion module 122 has updated the MR (MR_MetalShelf) with the data sent by the FEA engineer, the component designer can request new precise geometry representation and analysis result of the MR (MR_MetalShelf) to make design adjustment based on the FEA result. In other words, the examples as described in Examples 3 and 4 can go through multiple iterations.

Example 5: Interaction of Users with the System

Figure 8:
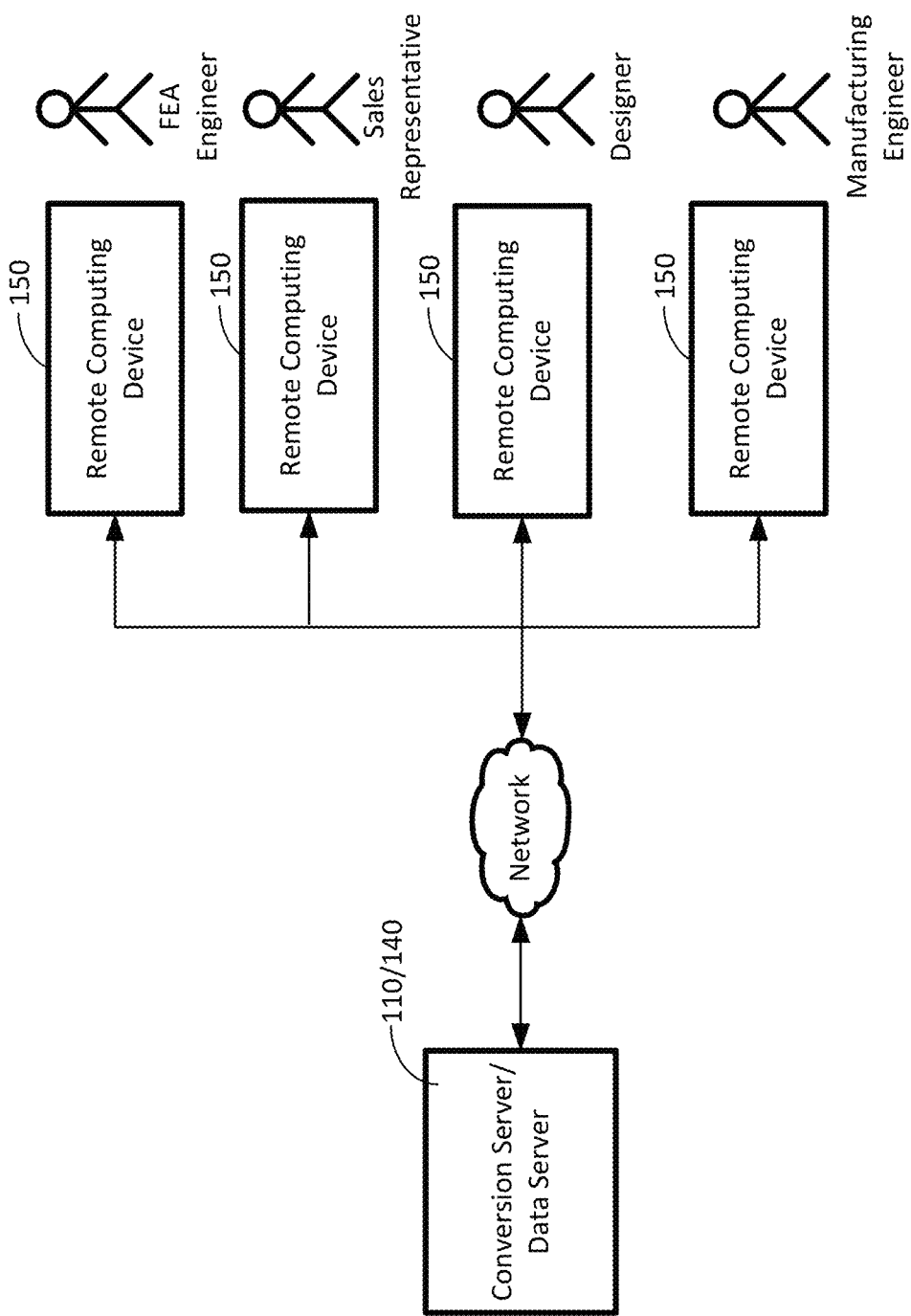
FIG. 8 schematically shows an example of multiple users interacting with the system according to embodiments of the present invention.

FIG. 8 schematically shows an example of multiple users interacting with the system according to embodiments of the present invention. As shown in FIG. 8, the server 110/140 (which includes the conversion server 110 and the data server 140) may generates different representations (by the conversion module 122) from the master representation information of the MRs (stored in the data store 148) for specific usage. Additional product related information stored with the MR is also transferred to the newly generated representation based on what is requested. A user at the remote computing device 150 can invoke a software application, load the requested representation and data to the application, make change of geometry and existing information, create new information or create its specific private data. After it is done, these data will be sent back to the server 110/140. Then the server 110/140 will update the master representation information of the MR by converting the IR back to MR, and transfer other data, or simply store user specific private data in the data store 148. After the MR is fully updated, the conversion module 122 can be invoked to generate the desired new representation. The automatic conversion from one representation to another maintains all needed data, facilitates the collaboration among different users without losing any necessary information.

Specifically, when the user is a FEA engineer, the typical tasks being performed by the FEA engineer may include: doing FEA, saving analysis results, writing commands, recommending changes, etc. The IR being requested by the FEA engineer may include: mesh data, boundary conditions, force, material property, CAE results, FEA private data, and other non-geometric data. When the user is a sales representative, the typical tasks being performed by the sales representative may include: composing a new product, querying BOM and pricing information, adding other customer requirements, etc. The IR being requested by the sales representative may include: non-precise geometry data, specific customer requirements, pricing, BOM, configuration information, and other private data. When the user is a designer, the typical tasks being performed by the designer may include: viewing CAE results, modifying geometry data, changing materials, creating PMI data, and generating BOM. The IR being requested by the designer may include: precise geometry data, CAE results, material property, and other designer private data. When the user is a manufacturing engineer, the typical tasks being performed by the manufacturing engineer may include: viewing PMI data, creating manufacturing process planning, generating NC codes, creating 3D printer data, etc. The IR being requested by the manufacturing engineer may include: PMI, 3D printer data, NC codes, material property, and other manufacturing related information. Other users of the system 100 may perform different actions and request different data from the server based on the need.

In certain embodiments, the system and methods as described above may include the following features:

(1) GRCS is a new idea of a systematic solution for automatic conversion of 3D object representations and preserve necessary product design information during the conversion.

(2) MR is a complete, unambiguous, and compact representation of the product design. It contains sufficient information to generate any other representation. In addition, it can host associated attribute information of the design. Therefore, any additional information added in any stage can be kept with the Master Representation.

(3) Individual Representation Generator (IRG) generates a particular representation from the Master representation. A Representation Generator has the intelligence to (a) Simplify the resulting representation from the Master Representation to better fits the need for a particular stage function. For instance, for a Finite-Element analysis or kinematic simulation in the engineering simulation stage, the small features such as holes and extrusions can be removed in order to improve efficiency.

(b) Add additional attribute information associate with the product design for specific needs of a particular stage function, such as manufacturing specific instructions.

(4) A Special Identifier (SI) contains sufficient information to recognize an associated 3D object from a content library or object stored with in local machine, Local Area Network, or on other website. Unique Identification Mechanism (UIM) is employed to identify individual 3D object by its SI and find associated MR. A 3D object can be a part, sub-assembly, assembly, or any other supported 3D components.

(5) A mechanism to keep design modification, simplification, and additional product attribute information that are created by an IRG or may be created at any stage with a particular representation using associated software tool. Furthermore, such information carries the knowledge whether it is this stage specific, or needed for other stages.

(6) The GRC capabilities of the system utilizes the UIM to find corresponding MR of the current representation. Then, based on the stored design modification, simplification, and additional product attribute information to update the MR. This update may include design changes and adding associated product attribute information of the design.

Another aspect of the present invention relates to a non-transitory computer readable medium storing computer executable code. In one embodiment, the computer executable code, when executed at a processor of at least one server computing device, is configured to: provide a data store being stored in the at least one server computing device, the data store storing master representation information of a plurality of MRs, wherein each of the MRs represents one or more of a plurality of 3D objects; obtain the master representation information corresponding to the MR of at least one selected object of the 3D objects from the data store; convert the master representation information obtained to individual representation information, wherein the individual representation information corresponds to an individual representation of the at least one selected object; send the individual representation information being converted and a modification tool to at least one remote computing device, wherein the at least one remote computing device is remotely connected to the at least one server computing device through a network, and the modification tool is executable by the at least one remote computing device; and in response to receiving modified individual representation information corresponding to the individual representation of the at least one selected object, convert the modified individual representation information received to the master representation information. In certain embodiments, the modification tool, when executed by the at least one remote computing device, is configured to, in response to receiving a modification action to the individual representation: modify the individual representation information to generate the modified representation information; and send the modified individual representation information back to the server computing device. In certain embodiments, the non-transitory computer readable medium may be implemented as the storage device 116 of the conversion server and the storage device 146 of the data server 140 as shown in FIG. 1.

The technology of the embodiments of the present invention may be implemented by software running on any kind of computers, mobile devices such as tablet or cell phone; and the interactive UI actions may be drag and drop, push and pull handles or any other actions that are conducted using mouse, touch screen, virtual reality devices, or any other devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present invention is defined by the appended claims rather than the foregoing description and the exemplary embodiments described therein.

What is claimed is:

1. A system with generalized representation conversion (GRC) capabilities, comprising:
at least one server computing device and at least one remote computing device, each comprising a processor and a storage device storing computer executable code, wherein the at least one remote computing device is remotely connected to the at least one server computing device through a network, each of the at least one remote computing device functions as a client computer, and at least one modification tool is executable by the processor of the at least one remote computing device;
wherein the computer readable code stored at the at least one server computing device comprises:
a data store configured to store master representation information of a plurality of master representations (MRs), wherein each of the MRs represents one or more of a plurality of three-dimensional (3D) objects, and for each of the MRs, the master representation information comprises geometry data and non-geometry data of the one or more objects being represented by the MR; and
a conversion module executable by the processor of the at least one server computing device, wherein the conversion module, when executed by the processor of the at least one server computing device, is configured to:
obtain, from the data store, the master representation information corresponding to the MR of at least one selected object of the 3D objects;
convert the master representation information obtained to individual representation information, wherein the individual representation information corresponds to an individual representation of the at least one selected object; and
in response to receiving modified individual representation information corresponding to the individual representation of the at least one selected object, convert the modified individual representation information received to the master representation information; and
wherein the at least one modification tool, when executed by the processor of the at least one remote computing device, is configured to, in response to receiving, from a user, a plurality of modification actions to the individual representation:
modify the individual representation information according to the modification actions received from the user to generate the modified individual representation information at the at least one remote computing device; and
send the modified individual representation information back to the conversion module at the at least one server computing device,
wherein the at least one modification tool is executed at the at least one remote computing device to modify the individual representation information according to the modification actions received from the user asynchronously, such that the modification tool is capable of modifying the individual representation information completely according to the modification actions received from the user solely at the at least one remote computing device,
wherein the conversion module is configured to, in response to receiving the modified individual representation information corresponding to the individual representation of the at least one selected object, convert the modified individual representation information received to the master representation information by:
determining, for each respective object of the 3D objects in the modified individual representation information, whether the respective object is a new object not existing in the data store or an existing object stored in the data store;
in response to determining that the respective object is the existing object,
determining whether the existing object is updated;
in response to determining that the existing object is updated, determining a type of update for the existing object, wherein the type of update for the existing object is selected from a group consisting of:
changing the geometry data of the existing object, deleting the existing object, and changing the non-geometry data of the existing object; and
in response to determining the type of update for the existing object is changing the geometry data of the existing object, replacing the geometry data of the existing object in the master representation information stored in the data store using the geometry data of the existing object in the modified individual representation;
in response to determining the type of update for the existing object is changing the non-geometry data of the existing object, replacing the non-geometry data of the existing object in the master representation information stored in the data store using the non-geometry data of the existing object in the modified individual representation; and
in response to determining the type of update for the existing object is deleting the existing object, deleting the existing object from the master representation information stored in the data store; and
in response to determining that the respective object is the new object,
determining whether the new object includes precise geometry data;
in response to determining that the new object includes the precise geometry data, generating new master representation information of a new MR having the new object in the data store using the precise geometry data of the new object; and
in response to determining that the new object does not include the precise geometry data, searching the master representation information stored in the data store for a corresponding object of the 3D objects to the new object, and generating the new master representation information of the new MR having the new object in the data store using a copy of the geometry data of the corresponding object as the geometry data of the new object.

2. The system of claim 1, wherein the network is an Internet, a Local Area Network (LAN), or a Wide Area Network (WAN).

3. The system of claim 1, wherein the data store is a local database stored in the at least one server computing device together with the conversion module and the modification tool.

4. The system of claim 1, wherein the at least one server computing device comprises:
a conversion server, storing the conversion module and the modification tool; and
a data server remotely connected to the conversion server through the network and storing the data store, wherein the data store is a virtual database resided in the data server.

5. The system of claim 1, wherein the conversion module is further configured to send the individual representation information being converted together with a special identifier (SI) to the at least one remote computing device through the network.

6. The system of claim 5, wherein the conversion module is configured to send the individual representation information being converted and the SI together with one of the at least one modification tool to the at least one remote computing device through the network, wherein the modification tool being sent to the remote computing device is executable by the remote computing device.

7. The system of claim 5, wherein the at least one modification tool is pre-installed in the at least one remote computing device to be executable by the remote computing device.

8. The system of claim 5, wherein the conversion module is configured to obtain, from the data store, the master representation information corresponding to the MR of the at least one selected object by:
receiving, from the at least one remote computing device, a request for the individual representation corresponding to the at least one selected object, wherein the request comprises the SI to identify the master representation information corresponding to the master representation of the at least one selected object; and
retrieving, from the data store, the master representation information based on the SI of the request using a unique identification mechanism (UIM).

9. The system of claim 8, wherein the conversion module is configured to convert the master representation information obtained to the individual representation information by:
retrieving, based on the request, information necessary for the individual representation from the master representation information of the at least one selected object; and
generating the individual representation information using the retrieved information necessary for the individual representation.

10. The system of claim 9, wherein the modification actions to the individual representation include an action of updating the MR of the at least one selected object, and the modification tool is configured to send the modified individual representation information and the SI back to the conversion module for updating the master representation information of the MR of the at least one selected object.

11. The system of claim 10, wherein the conversion module, in response to receiving the modified individual representation information corresponding to the individual representation of the at least one selected object and the SI, is configured to convert the modified individual representation information received to updated master representation information, and to store the updated master representation information in the data store to replace the master representation information of the MR of the at least one selected object.

12. The system of claim 11, wherein the conversion module is configured to convert the modified individual representation information received to updated master representation information by:
locating the master representation information corresponding to the SI in the data store; and
updating the master representation information using the modified individual representation information received to generate the updated master representation information.

13. The system of claim 9, wherein the individual representation information generated comprises at least a portion of the geometry data.

14. The system of claim 13, wherein the modification actions to the individual representation include an action of changing geometry of the at least one selected object, and the modification tool is configured to modify the individual representation information by changing the geometry data corresponding to the geometry of the at least one selected object.

15. The system of claim 13, wherein the individual representation information generated further comprises the non-geometry data, wherein the modification actions to the individual representation include an action of changing a non-geometry feature of the at least one selected object, and the modification tool is configured to modify the individual representation information by changing the non-geometry data corresponding to the non-geometry feature of the at least one selected object.

16. The system of claim 9, wherein the modification actions to the individual representation include an action of deleting the at least one selected object, and the modification tool is configured to modify the individual representation information by deleting information corresponding to the at least one selected object.

17. The system of claim 9, wherein the modification actions to the individual representation include an action of creating the new MR, and the modification tool is configured to send the modified individual representation information back to the conversion module for generating the new master representation information of the new MR.

18. The system of claim 17, wherein the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

19. The system of claim 17, wherein the new MR is created by combining a plurality of the individual representations.

20. The system of claim 1, wherein the modification tool comprises a computer-aided design (CAD) software configured to implement a geometric model of each of the plurality of 3D objects, and the geometric model is a solid shape model, a polygonal shape model, a point cloud set model, or a combination thereof.

21. The system of claim 1, wherein the modification tool comprises a computer-aided engineering (CAE) software to perform a CAE process and create or modify non-geometry engineering data, wherein the CAE process comprises finite element analysis, stress analysis, thermal analysis, electromagnetics analysis, fluid dynamic analysis, kinematics analysis, collision analysis, and dynamic analysis.

22. The system of claim 1, wherein the conversion module is configured to, in response to determining that the existing object is updated, determining the type of update for the existing object by:
   determining whether the type of update is changing of the existing object or deleting the existing object; and
   in response to determining that the type of update is changing the existing object, determining whether the changing is geometry change;
   wherein the type of update for the existing object is changing the geometry data of the existing object in the MR in response to determining that the changing is geometry change, and the type of update for the existing object is changing the non-geometry data of the existing object in the MR in response to determining that the changing is not geometry change.

23. A computer-implemented method of performing generalized representation conversion (GRC), comprising:

providing a data store being stored in at least one server computing device, the data store storing master representation information of a plurality of master representations (MRs), wherein each of the MRs represents one or more of a plurality of three-dimensional (3D) objects, and for each of the MRs, the master representation information comprises geometry data and non-geometry data of the one or more objects being represented by the MR;

obtaining, by a conversion module executed by the at least one server computing device, the master representation information corresponding to the MR of at least one selected object of the 3D objects from the data store;

converting, by the conversion module, the master representation information obtained to individual representation information, wherein the individual representation information corresponds to an individual representation of the at least one selected object;

sending, by the conversion module, the individual representation information being converted together with a special identifier (SI) to at least one remote computing device, wherein the at least one remote computing device is remotely connected to the at least one server computing device through a network, and at least one modification tool is executable by the at least one remote computing device; and in response to receiving, by the conversion module, modified individual representation information corresponding to the individual representation of the at least one selected object, converting the modified individual representation information received to the master representation information;

wherein the at least one modification tool, when executed by the at least one remote computing device, is configured to, in response to receiving, from a user, a plurality of modification actions to the individual representation:
   modify the individual representation information according to the modification actions received from the user to generate the modified individual representation information; and
   send the modified individual representation information back to the conversion module at the at least one server computing device, wherein the at least one modification tool is executed at the at least one remote computing device to modify the individual representation information according to the modification actions received from the user asynchronously, such that the modification tool is capable of modifying the individual representation information completely according to the modification actions received from the user solely at the at least one remote computing device, wherein the conversion module, when executed by the processor of the at least one server computing device, is configured to, in response to receiving the modified individual representation information corresponding to the individual representation of the at least one selected object, convert the modified individual representation information received to the master representation information by:
   determining, for each respective object of the 3D objects in the modified individual representation information, whether the respective object is a new object not existing in the data store or an existing object stored in the data store;

in response to determining that the respective object is the existing object,
  determining whether the existing object is updated;
  in response to determining that the existing object is updated, determining a type of update for the existing object, wherein the type of update for the existing object is selected from a group consisting of:
    changing the geometry data of the existing object, deleting the existing object, and changing the non-geometry data of the existing object; and
  in response to determining the type of update for the existing object is changing the geometry data of the existing object, replacing the geometry data of the existing object in the master representation information stored in the data store using the geometry data of the existing object in the modified individual representation;
  in response to determining the type of update for the existing object is changing the non-geometry data of the existing object, replacing the non-geometry data of the existing object in the master representation information stored in the data store using the non-geometry data of the existing object in the modified individual representation; and
  in response to determining the type of update for the existing object is deleting the existing object, deleting the existing object from the master representation information stored in the data store; and
in response to determining that the respective object is the new object,
  determining whether the new object includes precise geometry data:
  in response to determining that the new object includes the precise geometry data, generating new master representation information of a new MR having the new object in the data store using the precise geometry data of the new object; and
  in response to determining that the new object does not include the precise geometry data, searching the master representation information stored in the data store for a corresponding object of the 3D objects to the new object, and generating the new master representation information of the new MR having the new object in the data store using a copy of the geometry data of the corresponding object as the geometry data of the new object.

24. The computer-implemented method of claim 23, wherein the data store is a local database stored in the at least one server computing device together with the conversion module and the modification tool.

25. The computer-implemented method of claim 23, wherein the at least one server computing device comprises:
  a conversion server, storing the conversion module and the modification tool; and
  a data server remotely connected to the conversion server through the network and storing the data store, wherein the data store is a virtual database resided in the data server.

26. The computer-implemented method of claim 23, wherein the master representation information corresponding to the MR of the at least one selected object is obtained by the conversion module from the data store by:
  receiving, from the at least one remote computing device, a request for the individual representation corresponding to the at least one selected object, wherein the request comprises the SI to identify the master representation information corresponding to the master representation of the at least one selected object; and
  retrieving, from the data store, the master representation information based on the SI of the request using a unique identification mechanism (UIM).

27. The computer-implemented method of claim 26, wherein the master representation information obtained is converted by the conversion module to the individual representation information by:
  retrieving, based on the request, information necessary for the individual representation from the master representation information of the at least one selected object; and
  generating the individual representation information using the retrieved information necessary for the individual representation.

28. The computer-implemented method of claim 27, wherein the modification actions to the individual representation include an action of updating the MR of the at least one selected object, and the modification tool is configured to send the modified individual representation information and the SI back to the conversion module for updating the master representation information of the MR of the at least one selected object.

29. The computer-implemented method of claim 28, wherein the conversion module, in response to receiving the modified individual representation information corresponding to the individual representation of the at least one selected object and the SI, is configured to convert the modified individual representation information received to updated master representation information, and to store the updated master representation information in the data store to replace the master representation information of the MR of the at least one selected object.

30. The computer-implemented method of claim 29, wherein the conversion module is configured to convert the modified individual representation information received to updated master representation information by:
  locating the master representation information corresponding to the SI in the data store; and
  updating the master representation information using the modified individual representation information received to generate the updated master representation information.

31. The computer-implemented method of claim 27, wherein the individual representation information generated comprises at least a portion of the geometry data.

32. The computer-implemented method of claim 31, wherein the modification actions to the individual representation include an action of changing geometry of the at least one selected object, and the modification tool is configured to modify the individual representation information by changing the geometry data corresponding to the geometry of the at least one selected object.

33. The computer-implemented method of claim 31, wherein the individual representation information generated further comprises the non-geometry data, wherein the modification actions to the individual representation include an action of changing a non-geometry feature of the at least one selected object, and the modification tool is configured to modify the individual representation information by changing the non-geometry data corresponding to the non-geometry feature of the at least one selected object.

34. The computer-implemented method of claim 27, wherein the modification actions to the individual representation include an action of deleting the at least one selected object, and the modification tool is configured to modify the individual representation information by deleting information corresponding to the at least one selected object.

35. The computer-implemented method of claim 27, wherein the modification actions to the individual representation include an action of creating the new MR, and the modification tool is configured to send the modified individual representation information back to the conversion module for generating new master representation information of the new MR.

36. The computer-implemented method of claim 35, wherein the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

37. The computer-implemented method of claim 36, wherein the new MR is created by combining a plurality of the individual representations.

38. The computer-implemented method of claim 23, wherein the conversion module is configured to, in response to determining that the existing object is updated, determining the type of update for the existing object by:
    determining whether the type of update is changing of the existing object or deleting the existing object; and
    in response to determining that the type of update is changing the existing object, determining whether the changing is geometry change;
    wherein the type of update for the existing object is changing the geometry data of the existing object in the MR in response to determining that the changing is geometry change, and the type of update for the existing object is changing the non-geometry data of the existing object in the MR in response to determining that the changing is not geometry change.

39. A non-transitory computer readable medium storing computer executable code, wherein the computer executable code, when executed at a processor of at least one server computing device, is configured to:
    provide a data store being stored in the at least one server computing device, the data store storing master representation information of a plurality of master representations (MRs), wherein each of the MRs represents one or more of a plurality of three-dimensional (3D) objects, and for each of the MRs, the master representation information comprises geometry data and non-geometry data of the one or more objects being represented by the MR;
    obtain the master representation information corresponding to the MR of at least one selected object of the 3D objects from the data store;
    convert the master representation information obtained to individual representation information, wherein the individual representation information corresponds to an individual representation of the at least one selected object;
    send the individual representation information being converted together with a special identifier (SI) to at least one remote computing device, wherein the at least one remote computing device is remotely connected to the at least one server computing device through a network, and at least one modification tool is executable by the at least one remote computing device; and
    in response to receiving modified individual representation information corresponding to the individual representation of the at least one selected object, convert the modified individual representation information received to the master representation information;
    wherein the at least one modification tool, when executed by the at least one remote computing device, is configured to, in response to receiving, from a user, a plurality of modification actions to the individual representation:
        modify the individual representation information according to the modification actions received from the user to generate the modified representation information; and
        send the modified individual representation information back to the at least one server computing device,
    wherein the at least one modification tool is executed at the at least one remote computing device to modify the individual representation information according to the modification actions received from the user asynchronously, such that the modification tool is capable of modifying the individual representation information completely according to the modification actions received from the user solely at the at least one remote computing device,
    wherein the conversion module is configured to, in response to receiving the modified individual representation information corresponding to the individual representation of the at least one selected object, convert the modified individual representation information received to the master representation information by:
        determining, for each respective object of the 3D objects in the modified individual representation information, whether the respective object is a new object not existing in the data store or an existing object stored in the data store;
        in response to determining that the respective object is the existing object,
            determining whether the existing object is updated;
            in response to determining that the existing object is updated, determining a type of update for the existing object, wherein the type of update for the existing object is selected from a group consisting of:
        changing the geometry data of the existing object, deleting the existing object, and changing the non-geometry data of the existing object; and
            in response to determining the type of update for the existing object is changing the geometry data of the existing object, replacing the geometry data of the existing object in the master representation information stored in the data store using the geometry data of the existing object in the modified individual representation;
            in response to determining the type of update for the existing object is changing the non-geometry data of the existing object, replacing the non-geometry data of the existing object in the master representation information stored in the data store using the non-geometry data of the existing object in the modified individual representation; and
            in response to determining the type of update for the existing object is deleting the existing object, deleting the existing object from the master representation information stored in the data store; and in response to determining that the respective object is the new object,
  determining whether the new object includes precise geometry data;
  in response to determining that the new object includes the precise geometry data, generating new master representation information of a new MR having the new object in the data store using the precise geometry data of the new object; and
  in response to determining that the new object does not include the precise geometry data, searching the master representation information stored in the data store for a corresponding object of the 3D objects to the new object, and generating the new master representation information of the new MR having the new object in the data store using a copy of the geometry data of the corresponding object as the geometry data of the new object.

40. The non-transitory computer readable medium of claim 39, wherein the computer executable code comprises a conversion module executable by the at least one server computing device.

41. The non-transitory computer readable medium of claim 40, wherein the data store is a local database stored in the at least one server computing device together with the conversion module and the modification tool.

42. The non-transitory computer readable medium of claim 40, wherein the at least one server computing device comprises:
  a conversion server, storing the conversion module and the modification tool; and
  a data server remotely connected to the conversion server through the network and storing the data store, wherein the data store is a virtual database resided in the data server.

43. The non-transitory computer readable medium of claim 40, wherein the master representation information corresponding to the MR of the at least one selected object is obtained by the conversion module from the data store by:
  receiving, from the at least one remote computing device, a request for the individual representation corresponding to the at least one selected object, wherein the request comprises the SI to identify the master representation information corresponding to the master representation of the at least one selected object; and
  retrieving, from the data store, the master representation information based on the SI of the request using a unique identification mechanism (UIM).

44. The non-transitory computer readable medium of claim 43, wherein the master representation information obtained is converted by the conversion module to the individual representation information by:
  retrieving, based on the request, information necessary for the individual representation from the master representation information of the at least one selected object; and
  generating the individual representation information using the retrieved information necessary for the individual representation.

45. The non-transitory computer readable medium of claim 44, wherein the modification actions to the individual representation include an action of updating the MR of the at least one selected object, and the modification tool is configured to send the modified individual representation information and the SI back to the conversion module for updating the master representation information of the MR of the at least one selected object.

46. The non-transitory computer readable medium of claim 45, wherein the conversion module, in response to receiving the modified individual representation information corresponding to the individual representation of the at least one selected object and the SI, is configured to convert the modified individual representation information received to updated master representation information, and to store the updated master representation information in the data store to replace the master representation information of the MR of the at least one selected object.

47. The non-transitory computer readable medium of claim 46, wherein the conversion module is configured to convert the modified individual representation information received to updated master representation information by:
  locating the master representation information corresponding to the SI in the data store; and
  updating the master representation information using the modified individual representation information received to generate the updated master representation information.

48. The non-transitory computer readable medium of claim 44, wherein the individual representation information generated comprises at least a portion of the geometry data.

49. The non-transitory computer readable medium of claim 48, wherein the modification actions to the individual representation include an action of changing geometry of the at least one selected object, and the modification tool is configured to modify the individual representation information by changing the geometry data corresponding to the geometry of the at least one selected object.

50. The non-transitory computer readable medium of claim 48, wherein the individual representation information generated further comprises the non-geometry data, wherein the modification actions to the individual representation include an action of changing a non-geometry feature of the at least one selected object, and the modification tool is configured to modify the individual representation information by changing the non-geometry data corresponding to the non-geometry feature of the at least one selected object.

51. The non-transitory computer readable medium of claim 44, wherein the modification actions to the individual representation include an action of deleting the at least one selected object, and the modification tool is configured to modify the individual representation information by deleting information corresponding to the at least one selected object.

52. The non-transitory computer readable medium of claim 44, wherein the modification actions to the individual representation include an action of creating the new MR, and the modification tool is configured to send the modified individual representation information back to the conversion module for generating new master representation information of the new MR.

53. The non-transitory computer readable medium of claim 52, wherein the conversion module, in response to receiving the modified individual representation information corresponding to the individual representation of the at least one selected object, is configured to convert the modified individual representation information received to the new master representation information, to assign a new SI to the new MR, and to store the new master representation information in the data store as the master representation information of the new MR.

54. The non-transitory computer readable medium of claim 52, wherein the new MR is created by combining a plurality of the individual representations.

55. The non-transitory computer readable medium of claim 39, wherein the conversion module is configured to, in response to determining that the existing object is updated, determining the type of update for the existing object by:
   determining whether the type of update is changing of the existing object or deleting the existing object; and
   in response to determining that the type of update is changing the existing object, determining whether the changing is geometry change;
   wherein the type of update for the existing object is changing the geometry data of the existing object in the MR in response to determining that the changing is geometry change, and the type of update for the existing object is changing the non-geometry data of the existing object in the MR in response to determining that the changing is not geometry change.

* * * * *